United States Patent
Takiyama et al.

(10) Patent No.: US 7,641,837 B2
(45) Date of Patent: Jan. 5, 2010

(54) PRODUCTION METHOD OF ROLLED OPTICAL FILM HAVING COATING LAYER, ROLLED OPTICAL FILM, POLARIZING PLATE AND LIQUID CRYSTAL DISPLAY

(75) Inventors: Nobuyuki Takiyama, Kanagawa (JP); Kazuyuki Shimizu, Akashi (JP); Kousei Mizoguchi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 398 days.

(21) Appl. No.: 11/356,640

(22) Filed: Feb. 17, 2006

(65) Prior Publication Data
US 2006/0198991 A1 Sep. 7, 2006

(30) Foreign Application Priority Data
Feb. 21, 2005 (JP) .............................. 2005-044068

(51) Int. Cl.
*B28B 11/08* (2006.01)
*B29C 59/04* (2006.01)

(52) U.S. Cl. ........................ 264/284; 264/1.34; 264/1.6; 264/1.7; 264/134; 264/294; 427/277; 427/278; 427/355; 427/356; 427/365; 427/366; 428/172; 428/141

(58) Field of Classification Search .................. 156/184; 427/163.1, 365, 366, 355, 356, 359, 361, 427/372.2, 277; 264/284, 293, 1.34, 1.6, 264/1.7, 134, 171.13, 294, 345, 346; 428/172, 428/141

See application file for complete search history.

(56) References Cited

U.S. PATENT DOCUMENTS

| | | | | |
|---|---|---|---|---|
| 1,651,744 A | * | 12/1927 | Van Derhoef | 264/146 |
| 3,502,765 A | * | 3/1970 | Spencer | 264/230 |
| 4,185,068 A | * | 1/1980 | Schmidt et al. | 264/310 |
| 4,226,825 A | * | 10/1980 | Yamagis et al. | 264/235 |
| 4,304,750 A | * | 12/1981 | Pira et al. | 264/284 |
| 4,942,000 A | * | 7/1990 | Penoyer | 264/448 |
| 5,393,589 A | * | 2/1995 | Zeller et al. | 428/192 |

(Continued)

FOREIGN PATENT DOCUMENTS

JP 2001-91705 A 4/2001

(Continued)

OTHER PUBLICATIONS

Machine translation of JP 2001091705 A Takiyama et al.*

*Primary Examiner*—Rena L Dye
*Assistant Examiner*—Michele Jacobson
(74) *Attorney, Agent, or Firm*—Frishauf, Holtz, Goodman & Chick, P.C.

(57) ABSTRACT

A method for producing a roll film provided with a coat layer comprising the steps of: (i) producing a roll film; (ii) applying a first embossing treatment along a longitudinal direction of the roll film on a part of a lateral direction of the roll film; (iii) applying a coat layer on the roll film; (iv) applying a second embossing treatment along a longitudinal direction of the roll film on a part of a lateral direction of the roll film; (v) heat treating the roll film at a temperature of 50 to 150° C. for a duration of 1 to 30 days while the roll film is rolled in a roll.

8 Claims, 1 Drawing Sheet

U.S. PATENT DOCUMENTS

| | | | |
|---|---|---|---|
| 5,503,792 A * | 4/1996 | Kawamura et al. | 264/284 |
| 5,670,188 A * | 9/1997 | May et al. | 425/363 |
| 5,879,606 A * | 3/1999 | Fujikura et al. | 264/230 |
| 6,065,955 A * | 5/2000 | Fujikura et al. | 425/174.4 |
| 6,096,247 A * | 8/2000 | Ulsh et al. | 264/2.7 |
| 6,686,031 B2 * | 2/2004 | Matsufuji et al. | 428/212 |
| 6,858,293 B2 * | 2/2005 | Flosenzier et al. | 428/327 |
| 7,099,082 B2 * | 8/2006 | Kawanishi et al. | 359/499 |
| 7,147,453 B2 * | 12/2006 | Boegli | 425/363 |
| 7,166,321 B2 * | 1/2007 | Ogawa et al. | 427/162 |
| 2003/0170482 A1 * | 9/2003 | Murakami | 428/615 |
| 2004/0247889 A1 * | 12/2004 | Nakajima et al. | 428/423.1 |
| 2005/0266178 A1 * | 12/2005 | Shimizu | 428/1.31 |
| 2006/0182901 A1 * | 8/2006 | Takagi | 428/1.31 |
| 2007/0048461 A1 * | 3/2007 | Nakajima et al. | 428/1.31 |
| 2007/0128368 A1 * | 6/2007 | Minamino et al. | 427/377 |
| 2007/0134459 A1 * | 6/2007 | Hubert et al. | 428/40.1 |
| 2007/0195226 A1 * | 8/2007 | Aminaka et al. | 349/96 |
| 2008/0062366 A1 * | 3/2008 | Ohtani et al. | 349/122 |

FOREIGN PATENT DOCUMENTS

| | | |
|---|---|---|
| JP | 3226190 B2 | 8/2001 |
| JP | 2002-006104 A | 1/2002 |
| JP | 2002-211803 A | 7/2002 |

* cited by examiner

PRODUCTION METHOD OF ROLLED OPTICAL FILM HAVING COATING LAYER, ROLLED OPTICAL FILM, POLARIZING PLATE AND LIQUID CRYSTAL DISPLAY

This application is based on Japanese Patent Application No. 2005-044068 filed on Feb. 21, 2005 in Japanese Patent Office, the entire content of which is hereby incorporated by reference.

FIELD OF THE INVENTION

The present invention relates to a production method of optical film containing a plastic film substrate, and specifically relates to a production method of rolled film in which a functional layer is coated on the surface of a long plastic film substrate which is wound in a roll form.

BACKGROUND OF THE INVENTION

Various types of displays such as a liquid crystal TV, a plasma display (PDP) and an organic EL display in addition to a CRT have been developed, and the size thereof has been made larger. In accordance with a larger image plane and a higher image quality, it is usual to paste up an optical film provided with such as an antireflection layer on the front surface of a display to improve the visual recognition. Further, such a display comprising a large image plane is liable to be damaged due to direct hand touch or object contact. Therefore, an antireflection film provided with a hard coat layer, in which a hard coat layer is generally formed on a support and such as an antireflection layer is formed thereon, has been utilized to prevent abrasion.

As an antireflection film, a wide film having a width of not less than 1 m and further not less than 1.4 m has been required particularly due to a larger image plane. However, in the case of such a wide film to realize a large size as described above, color unevenness and periodical unevenness may be generated with respect to such as antireflection ability, tinting degree, phase difference ability and visible angle enlargement ability, and optical film provided with higher uniformity has been required without a difference between the outside and inside of a optical film roll, a difference between the center and side edge portions in the width direction, and a difference by lots. Further, film without deformation of a roll is required with respect to handling in the production process.

Heretofore, in the case of handling long rolled plastic film, known is a method, in which such as winding cinch and creasing during storage of a wound roll are prevented by providing a portion thicker than the film plane, which is called as a knurling or an embossing, on the both side portions of film (for example, refer to patent literatures 1 and 2).

On the other hand, various optical film having various types of functional thin layers on a long rolled plastic film substrate have been known, and to perform a thermal treatment, called as curing or aging, is known to improve strength of the thin film or to obtain a certain strength in a short period after forming a functional thin layer on said substrate (for example, refer to patent literatures 3 and 4). In these disclosed methods, it is described that optical film having a high surface hardness can be prepared by a thermal treatment, as a rolled form after having been coated and dried, at 40-150° C. for from 30 minutes to a few weeks.

However, in these conventional technologies, it is difficult to prepare optical film having a high uniformity without generation of color unevenness by applying these technologies to production of optical film particularly having a wide width, and strongly demanded has been a production method of high uniform optical film without generation of roll deformation and color unevenness as well as provided with a small difference by lots and a small difference between the outside and center of a roll.

Further, a thermal treatment in a wound and rolled state may be provided with respect to a substrate of rolled film having a coated layer. For example, there is a method to improve physical properties of a coated layer or film itself by a thermal treatment of a re-wound rolled film after such as a hard coat layer and an antireflection layer have been provided on a substrate of rolled film. However, it has been proved that there is a problem of significant increase of curl by a thermal treatment of a film substrate having a coated layer in a wound state as a roll form.

[Patent literature 1] JP-A No. 2002-211803 (Hereinafter, JP-A refers to Japanese Patent Publication Open to Public Inspection.)

[Patent literature 2] Japanese Patent No. 3226190

[Patent literature 3] JP-A No. 2001-91705

[Patent literature 4] JP-A No. 2002-6104

SUMMARY OF THE INVENTION

An object of the present invention is to provide a production method of a rolled film having a coated layer which can reduce a curl generated at the time of a thermal treatment of the rolled film having the coated layer in a rolled form. Further, another object is to provide a production method of highly uniform optical film without generation of roll deformation and color unevenness as well as having small difference among lots, small difference between the outside and center of a roll, and small difference between the center and side edge portions in the width direction.

One of the aspects of the present invention to achieve the above described objects is a method of manufacturing a rolled film having thereon a coated layer comprising the steps in the order named: (i) preparing a long substrate film; (ii) conducting a first embossing treatment on a part of a width of the long substrate film along a longitudinal direction of the long substrate film; (iii) forming the coated layer on the long substrate film to form a long coated film; (iv) conducting a second embossing treatment on the part of the width of the long coated film along the longitudinal direction of the long coated film; (v) winding the long coated film to form the rolled film having there on the coated layer; and (vi) heating the rolled film at a temperature of 50 to 150° C. for 1 to 30 days in a rolled state.

BRIEF DESCRIPTION OF THE DRAWINGS

FIG. 1 (*b*) is a schematic drawing of an embossed portion of a rolled film of the present invention having embossed portions on the both surfaces.

DESCRIPTION OF THE PREFERRED EMBODIMENTS

Figure 1:
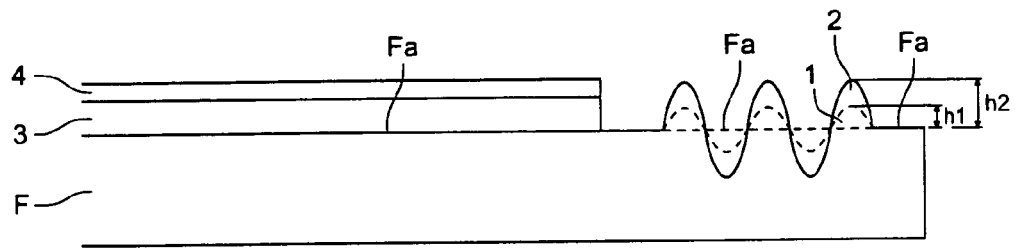
FIG. 1 (*a*) is a schematic drawing of an embossed portion of a rolled film of the present invention having an embossed portion only on one surface.
Figure 1:
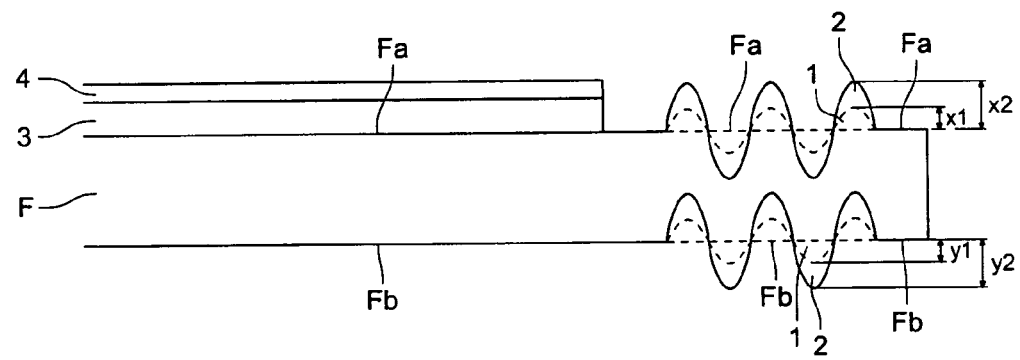
Figure 2:
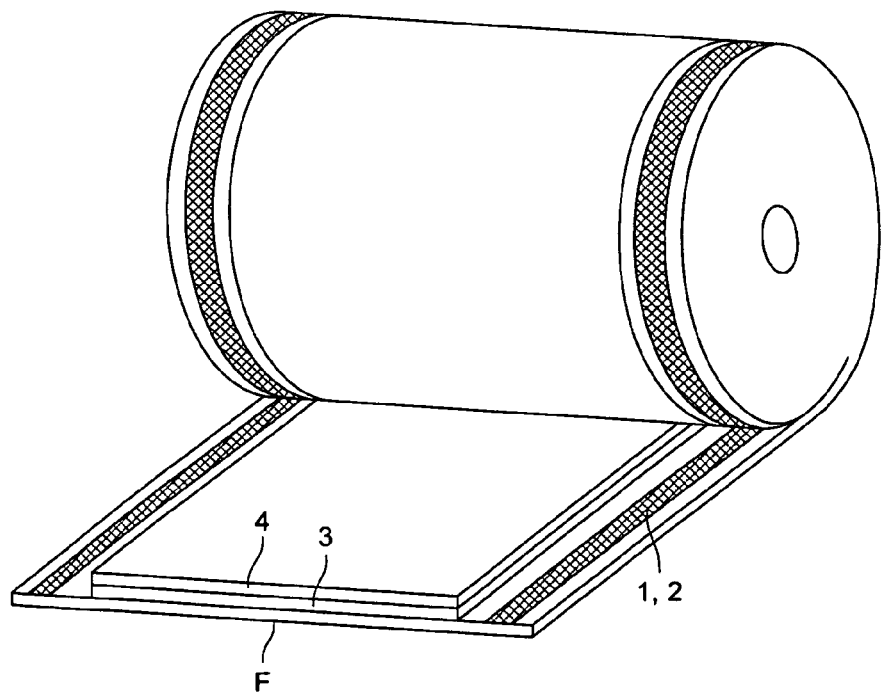
FIG. 2 is an oblique view of a rolled film of the present invention.

The above objects of the present invention are achieved by the following structures.

(1) A method of manufacturing a rolled film having thereon a coated layer comprising the steps of:

(i) preparing a long substrate film;

(ii) conducting a first embossing treatment on a part of a width of the long substrate film along a longitudinal direction of the long substrate film;

(iii) forming the coated layer on the long substrate film to form a long coated film;

(iv) conducting a second embossing treatment on the part of the width of the long coated film along the longitudinal direction of the long coated film;

(v) winding the long coated film to form the rolled film having thereon the coated layer; and (vi) heating the rolled film at a temperature of 50 to 150° C. for 1 to 30 days in a rolled state.

(2) The method of Item (1), wherein a height of embossing formed by the first and the second embossing treatments is 5 to 30 μm from a level of the substrate film.

(3) The method of Item (1) or Item (2), wherein a thickness of the coated layer after dried is 3 to 20 μm.

(4) The method of any one of Items (1) to (3), wherein a height of embossing formed by the second embossing treatment is larger than a height of embossing formed by the first embossing treatment.

(5) The method of one of Items (1) to (4), wherein a thickness of the long substrate film is 10 to 200 μm.

(6) The method of one of Items (1) to (5), wherein the coated layer comprises a hard coat layer having a hardness of 2H to 5H.

(7) The method of one of Items (1) to (6), wherein the coated layer comprises a hard coat layer having a hardness of 2H to 5H and an antireflection layer.

(8) The method of one of Items (1) to (7), wherein the rolled film having thereon a coated layer has a back coat layer on a rear surface of the rolled film reverse to the surface on which the coated layer is formed.

The present invention can provide a production method of highly uniform optical film without generation of winding deformation and color unevenness and particularly of more highly uniform optical film having small differences, among lots, between the outside and center of a roll as well as between the center and edges in the width direction.

In the following, the most preferred embodiments to practice the present invention will be detailed. In the present invention, a substrate of rolled film is a rolled film substrate having a width of 1-4 m, and indicates wound film thereof in a roll form. The length of the film is not shorter than 100 m and preferably 300-5000 m.

In the present invention, utilized is a rolled film which has been subjected to the first embossing treatment (hereinafter, an embossing treatment represents a treatment by which convexoconcave is formed on the rolled film) along the winding direction (or the longitudinal direction) in a part of the width direction of the rolled film. This means that the rolled film, which has been subjected to an embossing treatment, having a width of 5-50 mm, at a part of the film and preferably at the edge portions in the width direction of said rolled film, along the winding direction or the longitudinal direction of the aforesaid rolled film, and wound in a roll form, is utilized as a substrate.

To provide the second embossing treatment means that, in a process in which a coated layer is provided on the substrate film which has been subjected to the aforesaid first embossing treatment, and the substrate film is winded to form a rolled film, followed by conducting a thermal treatment by keeping the rolled film at a temperature of 50-150° C. for 1-30 days, an embossing treatment is further provided on the substrate film provided with the coated layer at a part in the width direction of the substrate film along the winding direction before said thermal treatment is carried out.

(Embossed Portion Ant Embossing Treatment)

First, an embossed portion and an embossing treatment according to the present invention will be explained with reference to the drawings. However, the drawings show an example and the present invention is not limited thereto.

FIG. 1 is a schematic drawing of an embossed portion according to the present invention.

The present invention is characterized in that, in a production method of optical film having a coated layer such as a hard coat layer or a hard coat layer and an a functional layer on a rolled film substrate, which is provided with at least one line of the first embossed portion along the winding direction of the film, the second embossing treatment is further provided after the coating process of said hard coat layer or said hard coat layer and a functional layer. It is preferred that the second embossing treatment is further performed on said first embossed portion to provide the second embossed portion. Namely, the present invention is characterized in that embossing treatments are repeatedly carried out: (i) after casting the film and before winding the cast film; and (ii) after coating the hard coat layer or coating the hard coat layer and a function layer, and before winding the coated film. In FIGS. 1 (a) and 1 (b), F represents a substrate film, 3 represents a hard coat layer, 4 represents a functional layer, and 1 and 2 each represent the first embossed portion and the second embossed portion, respectively.

An embossed portion of the present invention is a portion which is made higher in volume than the reference level of the film by providing a thick layer or an embossed portion of a band form along the winding direction of a rolled film substrate. Herein, the reference level of the film refers to the level of the surface of the substrate film which has not been subjected to an embossing treatment. In FIGS. 1 (a) and 1 (b), Fa and Fb represent the levels of the top surface and the bottom surface of the substrate film without an embossing treatment, respectively, (the reference levels of the film). The height of embossing after an embossing treatment represents the height of a portion having been made higher than the reference level of the film by the embossing treatment. In FIG. 1(a), h1 and h2 represent the height of embossing caused by the first and the second embossing treatments, respectively. In the case of embossing treatment provided on both the surfaces, the height of embossing represents the total height of the portion being higher than of the both reference levels of the film. That is, in FIG. 1 (b), the height of embossing due to the first embossing treatment is (x1+y1) and the height of embossing due to the second embossing treatment is (x2+y2). Specifically, the height of embossing can be determined by subtracting a mean thickness of the film from a mean thickness of the portion being higher formed by an embossing treatment. The height of embossing being 5-30 μm from the reference level of the film after the aforesaid embossing treatment means that the height of a portion made higher is 5-30 μm. At the time of an embossing treatment, the embossing treatment may be performed either to make only one surface convex or to make the both surfaces convex. The form of embossing is not specifically limited, and various patterns can be utilized. The area ratio of a portion being observed as a protuberance of each stripe of an embossing treatment against the total area of embossed portion is preferably 15-50%, and when the protuberance contained in each of these stripes is discontinuous, the number of the protuberance per 1 cm$^2$ is preferably 10-100 and more preferably 10-30.

As a method to provide embossing as an embossing treated potion, it is possible to be formed by pressing a heated embossing roll on a film. The treatment can be carried out at an ambient temperature, however, preferably carried out at not lower than "Tg of the film+20° C." and not higher than "melting point (Tm)+30° C.", more preferably at 150-300° C. and furthermore preferably at 170-290° C. An embossing roll is provided with minute embossing, and embossing can be formed on film to make the portion higher in volume by pressing said embossing. By continuously providing long length film with an embossing treatment, an embossed portion of a band form can be formed. At the stage of this embossing roll treatment, desired embossing can be achieved by employing an embossing roll having been etched so as to make the height of a convex portion of a desired height. The embossing treatment is preferably performed by sandwiching the embossing treatment portion with two rolls and applying heat and pressure, and an embossing roll is utilized as either one of or the both of said two rolls. The height of an embossed portion can be controlled by changing temperature and pressing pressure (for example, at a pressing pressure of 0.01-1 MPa).

Embossing treatment is preferably provided on the both edge portions in the width direction, and said embossing treatment having been provided before a process to apply a coated layer is called as the first embossing treatment and the embossing treated potion thereof is called as the first embossed portion. The first embossing treated potion is preferably provided on the both edge potions in the width direction of a rolled film substrate.

The width of an embossed portion is not specifically limited, however, is 0.5-3 cm, preferably 1-2.5 cm and specifically preferably 1.5-2 cm. The position of an embossing treated potion is not specifically limited, however, is preferably provided as a band form in a range of 0-50 mm from the film edge.

First embossed portion 1 is provided, for example, by contacting the above-described embossing roll or knurling roll on the both film edges at the time of production of transparent film, and second embossed portion 2 is provided on the first embossed portion after an optical functional layer including hard coat layer 3 or hard coat layer 3 and antireflection layer 4 as a functional layer has been coated. An embossed portion can be formed by utilizing a heated embossing roll before winding a rolled film substrate, and the second embossed portion can be formed similarly by utilizing a heated embossing roll after an optical functional layer having been coated and before winding.

The second embossing treatment is preferably performed before or simultaneously with forming a coated layer or after forming a coated layer, and before the winding process for a thermal treatment. It is specifically preferable to perform the second embossing treatment after forming a coated layer. The second embossed portion is preferably provided at the edge portion in the width direction of a film substrate and preferably provided in a range of not more than 50 mm from the edge. The second embossed portion is more preferably provided on the both edge portions, and may be provided in parallel at a position different from the first embossing treatment along the width direction or may be provided partly or totally overlapping with the first embossed portion. It is specifically preferable to provide the second embossed portion on the first embossed portion to make the second embossing treated potion with respect to precision at the time of embossing treatment. In the case of overlapping the first and the second embossed portions, since the formed embossing in the first embossing treatment can be utilized, an embossed portion having a desired height can be easily obtained with using a second embossing roll of which embossing height is not so high. Moreover, it is possible to form an embossed portion having a higher strength by overlapping the embossed portions, since the heating process is repeated at the same embossed portion. The embossed portion formed in this manner is considered to be hardly lost in the following thermal process.

The first embossed potion and the second embossed potion according to the present invention may be formed at least on the one surface of film or may be formed on the both surfaces. The height of embossing portion is preferably larger than the thickness of an optical functional layer including a hard coat layer with respect to achieving the effects of the present invention, and the height of an embossed portion after the first embossing treatment and the second embossing treatment is preferably set in a range of 5-30 μm and more preferably in arrange of 10-20 μm. Further, the height of embossing after the second embossing treatment is preferably higher than the height embossing after the first embossing treatment.

The width of a rolled film substrate is not less than 1.4 m with respect to a high manufacturing efficiency and a high utilization efficiency at the time of applying antireflection film to a display, and is preferably 1.4-4 m and specifically preferably 1.4-3 m. In the case of utilizing such a wide rolled film substrate, the above-described first embossed portion and second embossing treated potion are preferably provided not only at the edge portions of the film substrate but also at the inside thereof. That is, it is also preferable to provide plural lines of embossed portions on a film substrate. For example, by providing an embossed portion at the center of a film substrate, it is possible to effectively prevent broking which tends to be generated at the center of a wide film substrate.

Further in the present invention, to enhance uniformity of optical film at the core side—the roll center—the roll outside when being wound up in a roll form, the height of an embossing treated portion of the roll core side is preferably made higher than the height of an embossing treated portion of the roll outside; said height difference is preferably set in a range of 1-10 μm and more preferably in a range of 3-8 μm. For example, by processing under varied embossing forming conditions (temperature, pressure) so as to make a combination of such as embossed height at the roll core side (15 μm)/embossed height at the roll center portion (10 μm)/embossed height at the roll outside (5 μm), it is possible to assure a desired embossed height even when an embossed portion is collapsed due to the winding pressure toward the roll core side.

A winding method as a rolled form of optical film of the present invention includes a constant tension method, a constant torque method, a taper tension method and a programmed tension control method assuming a constant inner stress. The winding tension is preferably 400-30 N/m and preferably 300-100 N/m. For example, a winding tension at a winding machine can be set such as 220 N/m at the start of winding and 140 N/m at the finish of winding. Optical film of the present invention is preferably manufactured according to a production method in which a heat treatment in a rolled state is performed at 50-150° C. for 1-30 days after a coated layer such as an antireflection layer has been accumulated on rolled film of the present invention. The heat treatment is preferably performed at 50-120° C. The period of a heat treatment may be appropriately determined depending on the set temperature, and for example, the period is preferably not less than 3 days and less than 30 days at 50° C. or 1-3 days at 150° C.

To stably perform a heat treatment, it is preferable to be performed at the place where temperature and humidity are controllable, and is preferably performed in a heat treatment room such as a dustless clean room.

(Heat Treatment)

At the time of performing a heat treatment of a rolled form of optical film which is provided with these embossed portions and has been coated with a hard coat layer or a hard coat layer and a functional layer and is wound as a roll form, it is preferable to raise temperature up to a predetermined temperature at a raising rate of 0.1-10° C./hour, more preferably at a raising rate of 0.2-5° C./hour, still more preferably at a raising rate of 0.3-3° C./hour and most preferably at a raising rate of 0.4-1° C./hour. Further, the temperature for a heat treatment of film in a rolled form is preferably in a range of 50-150° C. and the period is preferably 1-30 days. Herein, 1 day means 24 hours.

The temperature raising pattern is not specifically limited; however, it may take a linear, curved or stepwise pattern for optimization. Further, there may be a temporary descending or rising of temperature during the temperature rising period. Further, it is more preferable to gradually raise temperature at a reduced rising rate at higher heating temperatures than to raise temperature at a constant rate.

Temperature descending after a heat treatment is not specifically limited; however, it is preferable to decrease temperature at a descending rate of 0.1-10° C./hour similar to temperature raise with respect to making uniform film shrinkage. A rate of temperature raise and decrease can be specifically determined by observing the relationship with shape change of rolled film; however, it has been proved that the above described range is most preferable judging from a practical experimental data.

To stably perform a heat treatment, it is preferably performed at a place where temperature and humidity are controllable and most preferably in a heat treatment room such as in a dustless clean room.

A winding core at the time of winding an optical film, which has been coated with a hard coat layer or a hard coat layer and a coated layer of such as an antireflection layer, may be comprised of any material provided being a cylindrical core, however, is preferably a hollow plastic core; the plastic material may be any kind provided being heat resistant plastic resistive against the thermal treatment temperature, and includes resin such as phenol resin, xylene resin, melamine resin, polyester resin and epoxy resin. Plastic material is preferably thermally curable resin reinforced by a filler material such as glass fiber. The winding number on these cores thereof is preferably not less than 100, more preferably not less than 500; and the winding thickness is not less than 5 cm and more preferably 10-100 cm.

When a long length rolled film substrate having been coated with layers such as a hard coat layer or a hard coat layer and an antireflection layer and wound on a plastic core, in this manner, is subjected to the aforesaid heat treatment in a wound state, it is preferable to rotate said roll, and the rotation may be carried out at a speed of not more than 1 rotation per 1 minute either continuously or intermittently. Further, it is preferable to perform at least 1 time of rewinding of said roll during the heating period.

It is preferable to use a rotation table for exclusive use in a heat treatment room to rotate a long length optical film roll which has been wound around a core.

When the rotation is intermittent, stopping time is preferably set within 10 hours, the stopping position is preferably made uniform in the circumferential direction not to concentrate on a same position, and the stopping time is more preferably set not longer than 10 minutes. The most preferable embodiment is continuous rotation.

As a rotation rate in the case of continuous rotation, time required for one rotation is preferably set not longer than 10 hours and practically in a range of from 15 minutes to 2 hours, because of an instrumental load at a faster rate.

Herein, in the case of a table wagon provided with a rotation function, rotation is preferably possible also during transportation or storage, and in this case, rotation functions effectively to prevent a black band which may be caused with a long storage period.

(Substrate of Rolled Film)

The substrate film of the rolled film (also referred to as the substrate of rolled film) usable in the present invention will now be described.

Listed as preferred conditions as the substrate of rolled film of the present invention are: easy production, excellent adhesion to the hard coat layer, optical isotropy, and optical transparency.

Transparency, as described in the present invention, refers to visible light transmittance of 60 percent or more, preferably 80 percent or more, and most preferably 90 percent or more.

The substrate of rolled film of the present invention preferably contains one of the following resins: for example, a cellulose ester resin, a polyester resin, a polycarbonate resin, a polyether sulfone resin, a polyacrylate resin, a cycloolefin resin and an acryl-styrene resin.

Examples of the substrate film (substrate of rolled film) include: cellulose ester based film, polyester based film, polycarbonate based film, polyacrylate based film, polysulfone (including polyestersulfone) based film, polyester film containing polyethylene terephthalate or polyethylene naphthalate, polyethylene film, polypropylene film, cellophane, cellulose diacetate film, cellulose triacetate film, cellulose acetate propionate film, cellulose acetate butyrate film, polyvinylidene chloride film, polyvinyl alcohol film, ethylene vinyl alcohol film, cyndioctatic polystyrene based film, polycarbonate film, cycloolefin polymer film (Arton, manufactured by JSR Corp.), Zeonex and Zeonare (both manufactured by Zeon Corp.), polymethylpentane film, polyether ketone film, polyether ketoneimide film, polyamide film, fluorine resin film, nylon film, polymethyl methacrylate film, acryl film and glass plates. Of these, preferred are cellulose triacetate film, polycarbonate film, and polysulfone (including polyethersulfone) film. In the present invention, from the viewpoint of production, cost, transparency, isotropy, and adhesion property, preferably employed is cellulose ester film (e.g., Konica Minolta Tac, trade names: KC8UX2MW, KC4UX2MW, KC8UY, KC4UY, KC5UN, KC12UR, KC8UCR-3, KC8UCR-4 and KC8UCR-5 manufactured by Konica Minolta Opto, Inc.). These films may be melt-casting films or solution-casting films. The thickness of the substrate film is preferably 10 to 200 μm. The thickness fluctuation of the substrate film in the lateral direction is preferably ±5% or less, more preferably ±1% or less, and still more preferably ±0.1% or less. The width of the rolled film is preferably 1 to 4 m. The length of the substrate of rolled film is usually 100 to 5000 m and served as a rolled film. With respect to enhancing the effect of the method of producing a hard coat film which is to be used for producing an antireflection layer of the present invention, the width of the substrate film is preferably 1.3 to 4 m, and more preferably 1.4 to 4 m.

With respect to the optical property of the substrate of rolled film, the retardation value in the thickness direction of the film Rt is preferably 0 to 300 nm, and the in-plane retardation value Ro is preferably 0 to 1000 nm.

In the present invention, as the substrate film, cellulose ester based film is most preferably used. Preferable examples of the cellulose ester include: cellulose acetate, cellulose acetate butyrate and cellulose acetate propionate, of these, more preferably used are cellulose acetate butyrate, cellulose acetate naphthalate and cellulose acetate propionate.

When the substitution degree of acetyl group is represented by X, the substitution degree of acyl group having 2 to 22 carbon atoms is represented by Y, preferably employable is an antireflection film having an antireflection layer and a hard coat layer on a substrate film containing mixed aliphatic acid esters of which X and Y values satisfy the following relationships, wherein the acyl group having 2 to 22 carbon atoms preferably contains a propionyl group or a butyryl group:

$2.3 \leq X+Y \leq 3.0$ $0.1 \leq Y \leq 1.2$ specifically preferably:

$2.5 \leq X+Y \leq 2.85$ $0.3 \leq Y \leq 1.2$

Cellulose as a source material of the cellulose ester of the present invention is not specifically limited, however, usable are cotton linter, wood pulp (obtained from acicular trees, or from broad leaf trees) or kenaf. The cellulose esters obtained from these cellulose source materials may also be used by mixing with each other in any ratio. In case, an acid anhydride (acetic anhydride, propionic anhydride, and butyric anhydride) is used as an acylation agent, cellulose ester can be prepared through a common reaction using an organic acid such as acetic acid and an organic solvent such as methylene chloride, in the presence of a protic catalyst such as sulfuric acid.

When an acylation agent is an acid chloride ($CH_3COCl$, $C_2H_5COCl$ or $C_3H_7COCl$), a reaction is carried out using a basic compound such as an amine as a catalyst. Specifically, the reaction can be carried out according to the method disclosed in JP-A No. 10-45804. The cellulose ester used in the present invention is obtained through a reaction using in combination of the above acylation agents depending on the acylation degree. In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as an acyl substitution degree (or as a degree of acyl substitution). For example, in the case of cellulose triacetate, all the three hydroxyl groups in one glucose unit are substituted by acetyl groups (practically: 2.6-3.0).

The acyl substitution degree can be measured according to ASTM-D817-96.

The number average molecular weight of the cellulose ester of the present invention is preferably 70000-250000 in order to obtain a sufficient mechanical strength of the film and to obtain moderate viscosity of the dope, and it is more preferably 80000-150000.

The cellulose ester film is preferably produced by a generally called "solution casting method" which includes casting a solution of dissolved cellulose ester (also referred to as a dope) from a pressure die onto a casting support, for example, an endless metal belt which is endlessly running or a rotating to form a film.

The organic solvent preferably used for preparing a dope includes the one which dissolves cellulose ester and has a moderate boiling point, examples of which include: methylene chloride, methyl acetate, ethylacetate, amyl acetate, methyl acetoacetate, acetone, tetrahydrofuran, 1,3-dioxolane, 1,4-dioxane, cyclohexanone, ethyl formate, 2,2,2-trifluoro ethanol, 2,2,3,3-tetra-fluoro-1-propanol, 1,3-difluoro-2-propanol, 1,1,1,3,3,3-hexafluoro-2-methyl-2-propanol, 1,1,1,3,3,3-hexafluoro-2-propanol, 2,2,33,3-pentafluoro-1-propanol, nitroethane, 1,3-dimethyl-2-imidazolidinone. Of these, examples of a preferable organic solvents (namely, a good solvent) include: organic halogenated solvents, such as methylene chloride, a dioxolane derivative, methyl acetate, ethyl acetate, acetone, methyl acetoacetate.

The boiling point of the organic solvent used in the present invention is preferably 30-80° C., in order to avoid foaming of the organic solvent in the web in the solvent evaporation process of the web which will be described below in the film forming process, the web being a film of the dope formed by casting the dope on a casting support. Examples of boiling points of the above described good solvents are as follows: methylene chloride (boiling point: 40.4° C.), methyl acetate (boiling point: 56.32° C.), acetone (boiling point: 56.3° C.) and ethylacetate (boiling point: 76.82° C.).

Among the above described good solvents, specifically preferable are methylene chloride or methyl acetate which is excellent in solubility of cellulose ester.

An alcohol having 1-4 carbon atoms of the content of 0.1-40% by weight is preferably contained in the above described organic solvent. The content is more preferably 5-30% by weight. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent Examples of an alcohol having a carbon number of 1 to 4 include: methanol, ethanol, n-propanol, iso-propanol, n-butanol, sec-butanol and tert-butanol.

Among these solvents, ethanol is specifically preferable, because ethanol is stable, having a relatively low boiling point, being easy to evaporate to dry and nontoxic. It is preferable to use the solvent which contains 5-30% by weight of ethanol and 70-95 wt % of methylene chloride. Methyl acetate can also be used instead of methylene chloride. In this case, the dope solution may be prepared via a cooling solution process.

The rolled film of the present invention is preferably stretched at least in the lateral direction of the film before being subjected to the first embossing process. Specifically, it is preferably stretched in a ratio of 1.02 to 1.5 in the lateral direction while the film contains 3 to 40% by weight of residual solvent in the solution-casting process. Further more preferably, the rolled film is biaxially stretched, namely, it is preferable to be biaxially stretched in a ratio of 1.01 to 1.5 in both the lateral direction and the longitudinal direction, while the film contains 3 to 40% by weight of residual solvent in the solution-casting process. Herein, the amount of residual solvent is represented by the following formula.

Amount of residual solvent (wt %)=$\{(M-N)/N\} \times 100$ wherein, M is the weight of a web (a cellulose ester film containing a solvent) at an arbitrary time, and N is the weight of the web after the it is dried at 110° C. for 3 hours.

When the above mentioned embossing treatment is carried out after the web is biaxially stretched, the deterioration of the rolling shape of the rolled optical film while storage is remarkably improved.

The biaxially stretched cellulose ester film of the present invention is preferably a transparent substrate film having light transmittance of 90% or more, and more preferably 93% or more.

The thickness of the rolled film of the present invention is preferably 10 to 200 μm, and more preferably 40 to 80 μm. The moisture permeability of the rolled film measured according to JIS Z 0208 (25 degrees C., 90% RH) is preferably 200 g/m²·24 h or less, more preferably 10 to 180 g/m²·24 h, and further more preferably 160 g/m²·24 h or less. Specifically preferable is a rolled film having a thickness of 10 to 80 μm and a moisture permeability described above.

When a cellulose ester film is used for the optical film of the present invention, the cellulose ester preferably contains a plasticizer, examples of which include: a phosphate ester plasticizer, a phthalate ester plasticizer, a trimellitate ester plasticizer, a pyromellitate ester plasticizer, a glycolate plasticizer, a citrate ester plasticizer, a polyester plasticizer and a polyalcohol ester plasticizer.

Examples of a phosphate ester plasticizer include: triphenyl phosphate, tricresyl phosphate, cresyl diphenyl phosphate, octyl diphenyl phosphate, diphenyl biphenyl phosphate, trioctyl phosphate and tributyl phosphate. Examples of a phosphate ester plasticizer include: diethyl phthalate, dimethoxy ethyl phthalate, dimethyl phthalate, dioctyl phthalate, dibutyl phthalate, di-2-ethylhexyl phthalate, butyl benzyl phthalate, diphenyl phthalate and dicyclohexyl phthalate. Examples of a trimellitate ester plasticizer include: tributyl trimellitate, triphenyl trimellitate and triethyl trimellitate. Examples of a pyromellitate ester plasticizer include: tetrabutyl pyromellitate, tetraphenyl pyromellitate and tetraethyl pyromellitate. Examples of a glycolate plasticizer include: triacetin, tributyrin, ethylphthalylethyl glycolate, methylphthalylethyl glycolate and butylphthalylbutyl glycolate. Examples of a citrate ester plasticizer include: triethyl citrate, tri-n-butyl citrate, acetyltriethyl citrate, acetyltri-n-butyl citrate and acetyltri-n-(2-ethylhexyl) citrate. Examples of other carboxylate ester plasticizer include: trimethylolpropane tribenzoate, butyl oleate, methyl ricinoleate acetyl, dibutyl sebacate and other trimellitate esters.

A copolymer of a glycol and a dibasic acid, for example, an aliphatic dibasic acid, a cyclane dibasic acid, and an aromatic dibasic acid, can be used as a polyester plasticizer. The aliphatic dibasic acid is not specifically limited, and examples include: adipic acid, sebacic acid, phthalic acid, terephthalic acid and 1,4-cyclohexyl dicarboxylic acid. Examples of a glycol include: ethylene glycol, diethylene glycol, 1,3-propylene glycol, 1,2-propylene glycol, 1,4-butylene glycol, 1,3-butylene glycol and 1,2-butylene glycol. These dibasic acids and glycol may be used alone or in combination of two or more.

Examples of a preferable polyalcohol ester plasticizer include plasticizers disclosed in JP-A No. 2003-12823.

In view of the film property and workability, the amount of the plasticizer is preferably 1 to 20% by weight, and specifically preferably 3 to 13% by weight based on the weight of the cellulose ester.

The optical film of the present invention preferably contains a UV absorbent.

Preferably usable is a UV absorbent having a high absorbance for UV rays of wavelength of 370 nm or less while having a high transmittance for visible light of wavelength of 400 nm or more in order to give a favorable displaying property of a liquid crystal display.

Examples of a UV absorbent preferably used in the present invention include: an oxybenzophenone compound, a benzotriazol compound, a salicylate ester compound, a benzophenone compound, a cyanoacrylate compound, a triazine compound and a nickel complex salt.

Examples of benzotriazol based UV absorbent will be given below, however, the present invention is not limited thereto.

UV-1: 2-(2'-hydroxy-5'-methylphenyl) benzotriazole

UV-2: 2-(2'-hydroxy-3',5'-di-tert-butylphenyl) benzotriazole

UV-3: 2-(2'-hydroxy-3'-tert-butyl-5'-methylphenyl) benzotriazole

UV-4: 2-(2'-hydroxy-3',5'-di-tert-butylphenyl)-5-chloro benzotriazole

UV-5: 2-(2'-hydroxy-3'-(3'',4'',5'',6''-tetrahydro phthalimidomethyl)-5'-methylphenyl) benzotriazole UV-6: 2,2-methylenebis(4-(1,1,3,3-tetramethylbutyl)-6-(2H-benzotriazole-2-yl) phenol)

UV-7: 2-(2'-hydroxy-3'-tert-butyl-5'-methylphenyl)-5-chlorobenzotriazole

UV-8: 2-(2H-benzotriazole-2-yl)-6-(n- and iso-dodecyl)-4-methylphenol (TINUVIN171, product of Ciba Specialty Chemicals Inc.)

UV-9: Mixture of octyl-3-[3-tert-butyl-4-hydroxy-5-(chloro-2H-benzotriazole-2-yl) phenyl]propionate and 2-ethylhexyl-3-[3-tert-butyl-4-hydroxy-5-(5-chloro-2H-benzotriazole-2-yl) phenyl] propionate (TINUVIN109, product of Ciba Specialty Chemicals Inc.)

Specific examples of a benzophenone based compound are shown below, however, the present invention is not limited thereto.

UV-10: 2,4-dihydroxy benzophenone

UV-11: 2,2'-dihydroxy-4-methoxybenzophenone

UV-12: 2-hydroxy-4-methoxy-5-sulfobenzophenone

UV-13: Bis(2-methoxy-4-hydroxy-5-benzoylphenyl methane)

As UV absorbent preferably used in the present invention, the benzotriazole or benzophenone type UV absorbent is preferably used which has high transparency, and minimizes deterioration of a polarizing plate or a liquid crystal. The benzotriazole type UV absorbent is especially preferably used, since it minimizes undesired coloration.

The UV absorbent disclosed in JP-A No. 2001-187825 having a distribution coefficient of 9.2 or more provide an improved surface quality of a long roll film and a favorable coating property. Preferable is a UV absorbent having a distribution coefficient of 10.0 or more.

A polymer UV absorbent (or a UV absorbing polymer) disclosed in Formula (1) or (2) in JP-A No. 6-148430 or Formula (3), (6) or (7) in JP-A No. 2000-156039 is also preferably employable. As a commercially available UV absorbent, PUVA-30M (produced by OTSUKA Chemical Co., Ltd.) is cited.

Further, to provide cellulose ester film utilized in the present invention with a sliding property, particles similar to those described in a coated layer (a hard coat layer) containing actinic ray curable resin can be utilized.

The primary particle diameter of particles incorporated in cellulose ester film utilized in the present invention is preferably not more than 20 nm, more preferably 5-16 nm and specifically preferably 5-12 nm. These particles are preferably contained in cellulose ester film by forming secondary particles having a particle diameter of 0.1-5 μm, and preferable mean particle diameter is 0.1-2 μm and more preferably 0.2-0.6 μm. This method can provide embossing having a height of approximately 0.1-1.0 μm on the film surface, and thereby the film surface can be provided with a suitable sliding property.

In measurement of a primary mean particle diameter of particles utilized in the present invention, the particles were observed through a transmission electron microscope (at a magnification of 500,000-2,000,000 times) to determine the primary particle diameter as an average value from observation of 100 particles.

The apparent specific gravity of particles is preferably not less than 70 g/liter, more preferably 90-200 g/liter and specifically preferably 100-200 g/liter. The larger is the apparent specific gravity, dispersion having the higher concentration can be prepared, which is preferable because of improved haze and less aggregation, and is specifically preferable at the time of preparation of a dope having a high solid density.

Silicon dioxide particles having a primary particle diameter of not more than 20 nm and an apparent specific gravity of 70 g/liter can be prepared, for example, by combustion of a mixture of gaseous silicon tetrachloride and hydrogen in air at 1000-1200° C. Further, these particles are available on the market under a product name of such as Aerosil 200V and Aerosil R972V (manufactured by Nippon Aerosil Co., Ltd.), which may be utilized.

The above described apparent specific gravity is determined by sampling a predetermined volume of silicon dioxide particles in a messcylinder to measure said weight and is calculated according to the following equation.

Apparent specific gravity(g/liter)=weight of silicon dioxide(g)/volume of silicon dioxide(liter)

A preparation method of a dispersion of particles utilized in the present invention includes, such as the following three types.

<Preparation Method A>

Dispersion is performed by use of a homogenizer after a solvent and particles have been stirring mixed. This is designated as particle dispersion. The particle dispersion is added into a dope solution to be mixed.

<Preparation Method B>

Dispersion is performed by use of a homogenizer after a solvent and particles have been stirring mixed. This is designated as particle dispersion. Separately, a small amount of cellulose triacetate is added in a solvent and is dissolved by stirring. The aforesaid particle dispersion is added therein and the resulting solution is mixed. This is designated as a particle additive solution. The particle additive solution is sufficiently mixed with a dope by use of an in-line mixer.

<Preparation Method C>

A small amount of cellulose triacetate is added in a solvent and is dissolved by stirring. Particles are added therein and dispersed by use of a homogenizer. This is designated as a particle additive solution. The particle additive solution is sufficiently mixed with a dope by use of an in-line mixer.

Preparation method A is superior in dispersibility of silicon dioxide particles and preparation method C is superior in that silicon dioxide particles are hard to be re-aggregated. Among them, the above-described preparation method B is a preferable method which is superior in both of dispersibility of silicon dioxide particles and re-aggregation resistance of silicon dioxide particles.

<Dispersion Method>

The concentration of silicon dioxide at the time of dispersing silicon dioxide particles by being mixed with a solvent is preferably 5-30 weight %, more preferably 10-25 weight % and most preferably 15-20 weight %. The lower is the dispersion density, there is a tendency of lowering liquid turbidity against the addition amount and it is preferable because of improved haze and minimum aggregation.

A utilized solvent includes preferably methyl alcohol, ethyl alcohol, propyl alcohol, isopropyl alcohol and butyl alcohol as lower alcohols. Solvents other than lower alcohols are not specifically limited; however, preferably utilized are solvents which are employed at the time casting of cellulose ester.

The addition amount of silicon dioxide particles against cellulose ester is preferably 0.01-5.0 weight parts, more preferably 0.05-1.0 weight parts and most preferably 0.1-0.5 weight parts. The larger is the addition amount, the superior is a dynamic friction coefficient; while, the smaller is the addition amount, the less is aggregation.

As a homogenizer, an ordinary homogenizer can be utilized. Homogenizers can be roughly classified into a media homogenizer and a media-less homogenizer. For dispersion of silicon dioxide particles, a media-less homogenizer is preferred due to a lower haze. A media homogenizer includes such as a ball mill, a sand mill and a die mill. A media-less homogenizer includes an ultrasonic type, a centrifugal type and a high pressure type, however, a high pressure homogenizer is preferable in the present invention. A high pressure homogenizer is an apparatus to make a special condition such as a high share or high pressure state by passing a composition, comprising particles and a solvent having been mixed, through a fine tube at a high speed. In the case of processing by a high pressure homogenizer, it is preferable, for example, to set the maximum pressure condition in a fine tube having a diameter of 1-2000 μm of not less than 9.807 MPa and more preferably of not less than 19.613 MPa. Further, at that time, preferable are those in which the maximum speed of not less than 100 m/sec and the heat transmission rate of not less than 420 kJ/hour.

High pressure homogenizers such as described above include a high pressure homogenizer (product name: Microfluidizer) manufactured by Microfluidics Corporation or Nanomizer manufactured by Nanomizer Corp., in addition to Manton-Gaulin type high pressure homogenizers such as a homogenizer manufactured by Izumi Food Machinery Co., Ltd. and UHN-01 manufactured by Sanwa Machine Co., Inc.

Further, it is preferable to cast a dope containing particles so as to directly contact to a casting support, because film having a high sliding property and a low haze can be prepared.

Further, an optical thin layer according to the present invention is provided after the film has been peeled off after casting, dried and wound as a roll form. The resulting film is generally subjected to a packaging process to protect the product from dirt and dust adhesion due to static electricity until the following process or shipment. The packaging material is not specifically limited provided achieving the above object, however, is preferably those not to disturb vaporization of a residual solvent from film. Specifically, listed are such as polyethylene, polyester, polypropylene, nylon, polystyrene, paper, various types of nonwoven fabric. Those comprising fiber of a mesh cloth form are more preferably utilized.

Cellulose ester film utilized in the present invention may be those having a multilayer constitution formed by such as a co-casting method employing plural number of dopes.

Co-casting may be any one of a successive multilayer casting method in which two or three layered constitution is formed through different dies, a simultaneous multilayer casting method in which two or three layered constitution is formed by joining dopes in a die having two or three slits, and a multi layer casting method which is a combination of a successive multi layer casting and simultaneous multi layer casting.

Further, with respect to cellulose ester film utilized in the present invention, those having few luminescent foreign matters in a film form are preferably utilized as a support. In the present invention, a luminescent foreign matter refers to a spot at which light of a light source shines through to be visible when cellulose ester film is placed between two polarizer plates arranged at a right angle (crossed-nicols) to be irradiated from one surface and said cellulose film is observed from the other side surface.

A polarizer plate utilized for this evaluation is preferably those comprising a protective film without luminescent foreign matters, and those employing a glass plate to protect polarizer is preferably utilized. One of reasons to generate luminescent foreign matters is considered to be un-acetylated cellulose contained in cellulose ester, and, as a countermeasure, foreign matters can be eliminated or reduced by utilizing cellulose ester containing a small amount of un-acetylated cellulose or by filtration of a dope in which cellulose ester is dissolved. Further, there is a tendency that the thinner is film thickness, reduced is the number of luminescent foreign matters per unit area, and the less is the cellulose content in film, reduced is luminescent foreign matters.

With respect to luminescent foreign matters, the number of those having a diameter of a luminescent point is not less than 0.01 mm is preferably not more than 200/cm$^2$, more preferably not more than 100/cm$^2$, not more than 50/cm$^2$, not more than 30/cm$^2$, not more than 10/cm$^2$ and most preferably 0.

Further, the number of a luminescent point having a diameter of 0.005-0.001 mm is also preferably not more than 200/cm$^2$, more preferably not more than 100/cm$^2$, not more than 50/cm$^2$, not more than 30/cm$^2$, not more than 10/cm$^2$ and most preferably 0. The number of luminescent points having a diameter of not more than 0.005 mm is also preferably the smaller.

In the case of removing luminescent foreign matters by filtration, to filter a composition added with a plasticizer is preferable with respect to a higher elimination efficiency of luminescent foreign matters than to filter a dope in which cellulose ester alone is dissolved. As a filter material, those conventionally well known such as glass fiber, cellulose fiber, filter paper and fluorine resin like ethylene tetrafluoride are preferably utilized; however, ceramics and metal are also preferably utilized. The absolute filtering precision is preferably not more than 50 μm, more preferably not more than 30 μm, furthermore preferably not more than 10 μm and specifically preferably not more than 5 μm.

These may be utilized by being appropriately combined. A filter material of either surface type or a depth type can be utilized; however, a depth type is preferred because of less clogging.

A functional layer according to the present invention is preferably an antireflection layer provided on a hard coat layer.

Next, a coated layer useful for antireflection film coated with an antireflection layer according to the present invention will be explained.

An antireflection layer or other thin layers of the present invention may be formed directly on the above-described film or sheet material, however, may be also formed on another intervening layer.

In the present invention, a coated layer coated on the surface of the thin layer forming side of a substrate (a thin layer forming side coated layer) includes such as an undercoat layer, a hard coat layer, a light diffusion layer, an anti-glare layer, an adhesive layer, an antistatic layer and an antistaining layer, and preferably includes such as a hard coat layer, an anti-glare layer, an antistatic layer and a conductive layer. Specifically, in the case of an antireflection film, a hard coat layer is preferably provided to enhance the strength of the surface hardness of the antireflection film. Further, such as a back-coat layer, an antistatic layer and an adhesive layer may be provided on the surface opposite to the side of forming a hard coat layer or an antireflection layer, of the substrate.

Herein, a hard coat layer utilized in such as antireflection film will be described.

A hard coat layer is preferably a layer formed by utilizing an actinic ray curable compound (resin) which can be cured by actinic rays such as ultraviolet rays, and can prepare an antireflection film having superior abrasion resistance. Thermally curable resin is also employed in a hard coat layer.

A hard coat layer is preferably a resin layer formed by polymerizing a component containing an ethylenically unsaturated monomer. Herein, an actinic ray curable resin layer refers to a layer which is cured via such as a crosslinking reaction by actinic ray radiation of such as electron rays in addition to ultraviolet rays. Actinic ray curable resin includes electron ray curable resin as a typical example, however, may be a resin which is curable by actinic rays other than ultraviolet rays and electron rays. Listed as ultraviolet curable resins may be, for example, ultraviolet curable urethane acrylic resins, ultraviolet curable polyester acrylate resin, ultraviolet curable epoxy acrylate resins, ultraviolet curable polyol acrylate resins, or ultraviolet curable epoxy resins.

The ultraviolet curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in JP-A No. 59-151110 can be used.

The ultraviolet ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the ultraviolet ray curable epoxyacrylate resin include those prepared by reacting an epoxyacrylate oligomer in the presence of a reactive diluting agent and a photoinitiator, disclosed for example, in JP-A No. 1-105738. As a photoinitiator, usable is one of or two or more of: a benzoine derivative, an oxime ketone derivative, a benzophenone derivative and a thioxanthone derivative.

Examples of the ultraviolet ray curable polyolacrylate resin include: trimethylolpropane triacrylate, ditrimethylolpropane tetraacrylate, pentaerythritol triacrylate, pentaerythritol tetraacrylate, dipentaerythritol hexaacrylate and alkyl-modified dipentaerythritol pentaacrylate.

These resin are usually utilized together with a photosensitizer known in the art. Also, the above described photoinitiator can be used as a photosensitizer. Examples of the photoinitiators for the ultraviolet ray curable resins include: acetophenone, benzophenone, hydroxy benzophenone, Michler's ketone, α-amyloxime ester, thioxanthone, and derivatives thereof. Sensitizers such as n-butylamine, triethylamine and tri-n-butylphosphine can be used in photo-reaction of epoxyacrylates. The content of a photoinitiator or a sensitizer in the ultraviolet ray curable resin layer is preferably 1 to 10% by weight, and more preferably 2.5 to 6% by weight, based on the weight of the ultraviolet ray cureble resin from which the weight of the solvent which will be evaporated after coated and dried is eliminated.

Examples of the polymerizable monomers having one unsaturated double bond in the molecule include common monomers such as: methyl acrylate, ethyl acrylate, butyl acrylate, vinyl acetate, benzyl acrylate, cyclohexyl acrylate, and styrene. Examples of the polymerizable monomers having two or more unsaturated double bonds in the molecule include: ethylene glycol diacrylate, propylene glycol diacrylate, divinylbenzene, 1,4-cyclohexane diacrylate, 1,4-cyclohexyldimethyl diacrylate, trimethylol propane triacrylate described above, and pentaerythritol tetraacrylate.

Examples of the UV curable resins available on the market utilized in the present invention include: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9 (K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

These actinic ray curable resin layers can be applied by any method well known in the art.

Examples of an organic solvent used for a coating solution of a UV curable-resin include: hydrocarbons, alcohols, ketones, esters, glycol ethers, and other organic solvents. These organic solvents may be also used in combination. The above mentioned organic solvents preferably contain propylene glycol monoalkyl ether (the alkyl having 1 to 4 carbon atoms) or propylene glycol monoalkyl ester (the alkyl having 1 to 4 carbon atoms) in an amount of 5% by weight or more, and more preferably 5 to 80% by weight.

Light sources to cure layers of UV curable-resin by photocuring reaction to form a hardened layer are not specifically limited, provided that the light source generate UV rays. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is preferably from 20 to 10000 mJ/cm$^2$, and more preferably from 50 to 2000 mJ/cm$^2$. For light of near-ultraviolet region—visible region, a photo sensitizer having an absorption maximum in this range may be utilized.

An ultraviolet ray curable resin composition is irradiated by ultraviolet rays from a light source, and the radiation time is preferably 0.5 seconds-5 minutes and more preferably 3 seconds-2 minutes, with respect to a curing efficiency and an operation efficiency.

In a cured film layer prepared in this manner, inorganic or organic particles are preferably added to prevent blocking or to enhance an anti-abrasion property. For example, listed are such as silicon oxide, titanium oxide, aluminum oxide, tin oxide, zinc oxide, calcium oxide, barium sulfate, talc, kaolin and calcium sulfate as inorganic particles and such as polymethacrylic methylacrylate resin powder, acryl styrene type resin powder, polymethylmethacrylate resin powder, silicone type resin powder, polystyrene type resin powder, polycarbonate resin powder, benzoguanamine type resin powder, melamine type resin powder, polyolefin type resin powder, polyester type resin powder, polyamide type resin powder, polyimide type resin powder or polyethylene fluoride type resin powder as organic particles, which can be added in an ultraviolet ray curable resin composition. The mean particle diameter of these particles is preferably 0.005-1 μm and specifically preferably 0.01-0.1 μm.

The ratio of an ultraviolet ray curable resin composition and particle powder for blending is preferably 0.1-30 weight parts and preferably 0.1-10 weight parts based on 100 weight parts of the resin composition.

A layer formed in this manner by curing ultraviolet ray curable resin may be a hard coat layer having a center line mean roughness Ra, which is defined in JIS B 0601, of 1-50 nm or an anti-glare layer having a Ra of approximately 0.1-1 μm.

As a method to coat a hard coat layer, an anti-glare layer or a back-coat layer on a substrate, utilized can be a commonly known method employing such as a gravure coater, a spinner coater, a wire-bar coater, a roll coater, a reverse coater, an extrusion coater or an air doctor coater. A liquid layer thickness (also referred to as a wet layer thickness) at the time of coating is approximately 1-100 μm, preferably 0.1-30 μm and more preferably 0.5-15 μm, while a dry layer thickness of a hard coat layer is preferably 1-20 μm.

In antireflection film of the present invention, it is preferable to prepare an antireflection layer by forming at least one type of layer comprising metal oxide, metal oxide nitride, metal nitride, organic polymer or a liquid crystal compound on the aforesaid rolled film substrate. An antireflection layer may be directly formed on a substrate, however, may be formed on a rolled film substrate on which at least one layer of the aforesaid hard coat layer or other coated layers having been provided to form a roughness surface. As another coated layer, preferable is the aforesaid curable resin layer having a center line mean roughness (Ra), which is defined in JIS B 0601, of 0.01-1 μm. These are actinic ray curable resin layers which are cured with actinic rays such as ultraviolet rays. A metal oxide layer according to the present invention is formed on such an ultraviolet ray curable resin layer, whereby antireflection film having a superior abrasion resistance can be prepared.

A metal oxide layer specifically preferably utilized will be now explained as an example of an antireflection layer of the present invention.

A metal oxide layer is preferably utilized in at least one of a high refractive index layer, a medium refractive index layer and a low refractive index layer.

A method to provide a metal oxide layer includes such as coating, an atmospheric pressure plasma CVD method, spattering and evaporation, however, in the present invention, antireflection layer is formed by coating.

A method to form a metal oxide layer by coating will be now explained.

A basic constitution of antireflection film of the present invention is explained. For example, a preferable antireflection film is provided with a layer structure comprising a transparent substrate, a hard coat layer, a medium refractive index layer, a high refractive index layer and a low refractive index layer in this order. A transparent substrate, a hard coat layer, a medium refractive index layer, a high refractive index layer and a low refractive index layer have refractive index satisfying the following relationship.

Refractive index of low refractive index layer<refractive index of transparent substrate<refractive index of hard coat layer<refractive index of medium refractive index layer<refractive index of high refractive index layer.

In an antireflection film provided with a medium refractive index layer, a high refractive index layer and a low refractive index layer, it is preferable to make a medium refractive index layer satisfy following numerical equation (1), a high refractive index layer satisfy following numerical equation (2) and a low refractive index layer satisfy following numerical equation (3) as described in JP-A No. 59-50401, whereby possible is a design to further lower a mean reflectance of antireflection film.

$$(h\lambda/4) \times 0.7 < n3d3 < (h\lambda/4) \times 1.3 \quad \text{numerical equation (1)}$$

wherein, h represents a positive integer (generally 1, 2 or 3), n3 represents a refractive index of a medium refractive index layer, and d3 represents a layer thickness (nm) of a medium refractive index layer. Further, $\lambda$ represents a wavelength in a range of 350-800 (nm).

$$(j\lambda/4) \times 0.7 < n4d4 < (j\lambda/4) \times 1.3 \quad \text{numerical equation (2)}$$

wherein, j represents a positive integer (generally 1, 2 or 3), n4 represents a refractive index of a high refractive index layer, and d4 represents a layer thickness (nm) of a high refractive index layer. Further, $\lambda$ represents a wavelength in a range of 350-800 (nm).

$$(k\lambda/4) \times 0.7 < n5d5 < (k\lambda/4) \times 1.3 \quad \text{numerical equation (3)}$$

wherein, k represents a positive odd number (generally 1), n5 represents a refractive index of a low refractive index layer, and d5 represents a layer thickness (nm) of a low refractive index layer. Further, $\lambda$ represents a wavelength in a range of 350-800 (nm).

Further, in the present invention, it is also preferable to form antiglare antireflection film by applying roughness on a hard coat layer or a high refractive index layer.

In addition to this, also preferable is a layer structure comprising a transparent substrate, a hard coat layer (or an antiglare layer), a high refractive index layer, a low refractive index layer, a high refractive index layer and a low refractive index layer in this order. The surface low refractive index layer is preferably provided with an antistaining property, and an antistaining layer may be provided on the surface.

(High Refractive Index Layer and Medium Refractive Index Layer)

In the present invention, a high refractive index layer is preferably arranged between a transparent substrate or a transparent substrate provided with a hard coat layer and a low refractive index layer. Further, to arrange a medium refractive index layer between a transparent substrate and a high refractive index layer is preferred with respect to reduction of the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm-1 µm, more preferably 10 nm-0.2 µm and most preferably 30 nm-0.1 µm. The haze of a high refractive index layer and a medium refractive index layer is preferably not more than 5%, more preferably not more than 3% and most preferably not more than 1. The strength of a high refractive index layer and a medium refractive index layer is preferably not less than H based on pencil hardness at a loading weight of 1 kg, more preferably not less than 2H and most preferably not less than 3H. A high refractive index layer and a medium refractive index layer preferably contain inorganic particles and binder polymer.

A refractive index of particles contained in a high refractive index layer and a medium refractive index layer is preferably 1.80-2.80 and more preferably 1.90-2.80. A weight average primary particle diameter of inorganic particles is preferably 1-150 nm, more preferably 1-100 nm and most preferably 1-80 nm. A weight average diameter of inorganic particles in a layer is preferably 1-200 nm, more preferably 5-150 nm, furthermore preferably 10-100 nm and most preferably 10-80 nm. A mean particle diameter of inorganic particles can be measured by a light scattering method when it is not less than 20-30 nm, and by electronmicrophotography when it is not more than 20-30 nm. A specific surface area of inorganic particles is preferably 10-400 m$^2$/g, more preferably 20-200 m$^2$/g and most preferably 30-150 m$^2$/g.

Inorganic particles are preferably particles formed from oxide or sulfide of metal. Examples of oxide or sulfide of metal include titanium dioxide (for example, rutile, rutile/anatase mixed crystalline, anatase, amorphous structure), tin oxide, indium oxide, zinc oxide, zirconium oxide and zinc sulfide. Among them, specifically preferable are titanium oxide, tin oxide and indium oxide. Inorganic particles can contain other elements in addition to oxide or sulfide of metal which is a primary component. A primary component means a component having the largest content (weigh %) among components constituting the particles. Examples of other elements include Ti, Zr, Sn, Sb, Cu, Fe, Mn, Pb, Cd, As, Cr, Hg, Zn, Al, Mg, Si, P and S.

Inorganic particles may be surface treated. The surface treatment can be performed by utilizing an inorganic compound or an organic compound. Examples of an inorganic compound utilized for the surface treatment include alumina, silica, zirconium oxide and iron oxide. Among them, preferable are alumina and silica. Examples of an organic compound utilized for the surface treatment include polyol, alkanolamine, stearic acid, a silane coupling agent and a titanate coupling agent. Among them, most preferable is a silane coupling agent. At least two types of surface treatments may be employed in combination. The shape of inorganic particles is preferably a rice grain form, a spherical form, a cubic form, a cone form or an irregular form. At least two types of inorganic particles may be utilized in combination in a high refractive index layer and a medium refractive index layer.

The ratio of inorganic particles in a high refractive index layer and a medium refractive index layer is preferably 5-65 volume %, more preferably 10-60 volume % and furthermore preferably 20-0.55 volume %.

Inorganic particles are supplied to a coating solution in a state of being dispersed in a medium to form a high refractive index layer and a medium refractive index layer. As a dispersion medium of inorganic particles, a liquid having a boiling point of 60-170° C. is preferably utilized. Specific examples of a dispersion solvent include water, alcohols (such as methanol, ethanol, isopropanol, butanol and benzyl alcohol), ketones (such as acetone, methyl ethyl ketone, methyl isobutyl ketone and cyclohexanone), esters (such as methyl acetate, ethyl acetate, propyl acetate, butyl acetate, methyl formate, ethyl formate, propyl formate and butyl formate), aliphatic hydrocarbons (such as hexane and cyclohexane), hydrocarbon halogenides (such as methylene chloride, chloroform and carbon tetrachloride), aromatic hydrocarbons (such as benzene, toluene and xylene), amides (such as dimethylformamide, dimethylacetoamide and N-methyl pyrrolidone), ethers (such as diethyl ether, dioxane and tetrahydrofuran), ether alcohols (such as 1-methoxy-2-propanol). Among them specifically preferable are toluene, xylene, methyl ethyl ketone, methyl isobutyl ketone, cyclohexanone and butanol.

Inorganic particles can be dispersed in a medium by use of a homogenizer. Examples of a homogenizer include a sand grinder mill (such as pin-attached beads mill), a high-speed impeller mil, a pebble mill, a roller mill, an atliter and a colloidal mill. A sand grinder mill and a high-speed impeller mill are specifically preferred. Further, a preliminary dispersion may be performed. Examples of homogenizer utilized for preliminary dispersion include a ball mill, a three-roll mill, a kneader and an extruder.

In a high refractive index layer and a medium refractive index layer, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin (hereinafter, generally referred to as polyolefin), polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably are cross-linked compounds of polyolefin. Further, a cross-linked polymer is furthermore preferable to be provided with an anionic group. An anionic group has a function to maintain the dispersion state of inorganic particles, and the cross-linked structure is provided with a function to strengthen the film by providing the polymer with film forming ability. The above-described anionic group may be directly bonded or bonded via a connecting group, to the polymer chain, however, is preferably connected to the main chain via a connecting group as a side chain.

Examples of an anionic group include a carboxylic acid group (carboxyl), a sulfonic acid group (sulfo), and phosphoric acid group (phosphono). Among them, sulfonic acid group and a phosphoric acid group are preferred. Herein an anionic group may be in a salt form. A cation to form salt with an anionic group is preferably an alkali metal ion. Further a proton of an anionic group may be dissociated. A connecting group to bond an anionic group and a polymer chain is preferably a divalent group selected from —CO—, —O—, an alkylene group, an arylene group and combinations thereof. Cross-linked polymer as preferable binder polymer is preferably copolymer provided with a repeating unit having an anionic group and a repeating unit having a cross-linked structure. In this case, the ratio of a repeating unit having an anionic group in copolymer is preferably 2-96 weight %, more preferably 4-94 weight % and most preferably 6-92 weight %. The repeating unit may be provided with not less than two anionic groups.

Cross-linked polymer having an anionic group may contain another repeating unit (a repeating unit without an anionic group nor a cross-linked structure). Another repeating unit is preferably a repeating unit having an amino group or a quaternary ammonium group, and a repeating unit having a benzene ring. An amino group or a quaternary ammonium group is provided with a function to maintain a dispersion state of inorganic particles similar to an anionic group. A benzene ring is provided with a function to increase a refractive index of a high refractive index layer. Herein, a similar effect can be obtained, even when an amino group, a quaternary ammonium group and a benzene ring is contained in a repeating unit having an anionic group or a cross-linked structure.

In cross-linked polymer described above, which contains a repeating unit having an amino group or a quaternary ammonium group as a constituent unit, an amino group or a quaternary ammonium group may either directly bond to a polymer chain or may bond to a polymer chain via a connecting group as a side chain, however, the latter is preferable. An amino group or a quaternary ammonium group is preferably a secondary amino group, a tertiary amino group or a quaternary ammonium group and more preferably a tertiary amino group or a quaternary ammonium group. A group which bonds to a nitrogen atom of a secondary amino group, a tertiary amino group or a quaternary ammonium group, is preferably an alkyl group, more preferably an alkyl group having a carbon number of 1-12 and furthermore preferably an alkyl group having a carbon number of 1-6. A counter ion of a quaternary ammonium group is preferably a halide ion. A connecting group which bonds an amino group or a quaternary ammonium group with a polymer chain is preferably a divalent group selected from —CO—, —NH—, —O—, an alkylene group, an arylene group and combinations thereof. In the case that cross-linked polymer contains a repeating unit provided with an amino group or a quaternary ammonium group, the ratio is preferably 0.06-32 weight %, more preferably 0.08-30 weight % and most preferably 0.1-28 weight %.

Cross-linked polymer is preferably formed by a polymerization reaction simultaneous with or after coating of the coating solutions for a high refractive index layer and a medium refractive index layer, which have been prepared by blending monomer to form cross-linked polymer. Each layer is formed simultaneous with generation of cross-linked polymer. Monomer having an anionic group functions as a dispersant of inorganic particles in a coating solution. Monomer having an anionic group is utilized preferably at 1-50 weight %, more preferably at 5-40 weight % and furthermore preferably at 10-30 weight %, against inorganic particles. Further, monomer having an amino group or a quaternary ammonium group is preferably utilized at 3-33 weights against monomer having an anionic group. By a method in which cross-linked polymer is formed by a polymerization reaction simultaneous with or after coating of a coating solution, these monomer can effectively function before coating of the coating solution.

Examples of monomer having at least two ethylenically unsaturated group include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri (meth)acrylate, trimethyloletheane tri(meth)acrylate, dipentaerythritol tetra(meth)acrylate, dipentaerythritol penta (meth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.); Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator which are utilized to form binder polymer of a hard coat layer.

As a polymerization initiator, those available on the market may be utilized. A polymerization accelerator may be utilized in addition to a polymerization initiator. The addition amount of a polymerization initiator and a polymerization accelerator is preferably in a range of 0.2-10 weights based on the total amount of monomer. Polymerization of monomer (or oligomer) may be accelerated by heating the coating solution (a dispersion of inorganic particles containing monomer). Further, a thermal curing reaction of a formed polymer may be additionally performed by heating after photopolymerization reaction after coating.

Polymer having a relatively high refractive index is preferably utilized in a medium refractive index layer and a high refractive index layer. Examples of polymer having a high refractive index include polystyrene, styrene copolymer, polycarbonate, melamine resin, phenol resin, epoxy resin and polyurethane prepared by a reaction of cyclic (alicyclic or aromatic) isocyanate and polyol. In addition to these, such as polymer having another cyclic (aromatic, heterocyclic or alicyclic) group and polymer having a halogen atom other than fluorine are also utilized as polymer having a high refractive index.

A metal oxide layer is preferably provided by coating a coating solution containing inorganic particles comprising metal oxide.

A high refractive index layer or a medium refractive index layer may be formed from an organometallic compound provided with film forming ability or from said compound in combination with inorganic particles.

An organometallic compound is preferably capable of being dispersed in an appropriate solvent or a liquid. Examples of an organometallic compound include metal alcolate (such as titanium tetraethoxide, titanium tetra-i-propoxide, titanium n-propoxide, titanium tetra-n-butoxide, titanium tetra-sec-butoxide, titanium tetra-tert-butoxide, aluminum tetraethoxide, aluminum-tri-i-propoxide, aluminum tributoxide, antimony triethoxide, antimony tributoxide, zirconium tetraethoxide, zirconium tetra-1-propoxide, zirconium tetra-n-propoxide, zirconium tetra-n-butoxide, zirconium tetra-sec-butoxide and zirconium tetra-tert-butoxide) chelating compounds (such as di-isopropoxytitanium bisacetylacetonate, di-butoxytitanium bisacetylacetonate, diethoxytitanium bisacetylacetonate, bisacetylacetone zirconium, diisopropoxy acetylacetonatoaluminum, aluminum acetylacetonate, aluminum di-n-butoxide monoacetylacetonate, aluminum di-1-propoxide monomethylacetylacetonate and tri-n-butoxidezirconium monoethylacetylacetonate), organic acid salt (such as zirconyl ammonium carbonate) and zirconium.

(Low Refractive Index Layer)

Low refractive index layers usable in the present invention include a low refractive index layer which is formed by crosslinking of fluorine containing resins (hereinafter referred to as "fluorine containing resins prior to crosslinking") which undergo crosslinking by heat or ionizing radiation, a low refractive index layer prepared employing a sol-gel method, and a low refractive index layer composed of particles and binder polymers in which voids exist among particles or in the interior of the particles. A smaller refractive index of the low refractive index layer is preferred to improve antireflection performance, however, it becomes difficult to provide desired strength. In view of the above conflicting effects, the refractive index of the low refractive index layer is preferably 1.30-1.50, and is more preferably 1.35-1.49, when measured at a wavelength of 550 nm at 23° C. The thickness of the low refractive index layer is preferably 5 nm-0.5 µm, more preferably 10 nm-0.3 µm, and most preferably 30 nm-0.2 µm.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). JP-A Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenically unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenically unsaturated group with photo-radical generating agents or an epoxy group with photolytically acid generating agents, the polymers are of an ionizing radiation curable type.

Further, employed as a fluorine containing resins prior to coating may be fluorine containing copolymers which are prepared by employing the above monomers with fluorine containing vinyl monomers, and monomers other than monomers to provide a crosslinking group in addition to the above monomers. Monomers capable being simultaneously employed are not particularly limited. Those examples include olefins (ethylene, propylene, isoprene, vinyl chloride, and vinylidene chloride); acrylates (methyl acrylate, ethyl acrylate, and 2-ethylhexyl acrylate); methacrylates (methyl methacrylate, ethyl methacrylate, butyl methacrylate, and ethylene glycol dimethacrylate); styrene derivatives (styrene, divinylbenzene, vinyltoluene, and α-methylstyrene); vinyl ethers (methyl vinyl ether); vinyl esters (vinyl acetate, vinyl propionate, and vinyl cinnamate); acrylamides (N-tert-butylacrylamide and N-cyclohexylacrylamide); methacrylamides; and acrylonitrile derivatives. Further, in order to provide desired lubricating properties and antistaining properties, it is also preferable to introduce a polyorganosiloxane structure or a perfluoropolyether structure into fluorine containing copolymers. The above introduction is performed, for example, by polymerization of the above monomers with polyorganosiloxane and perfluoroether having, at the end, an acryl group, a methacryl group, a vinyl ether group, or a styryl group and reaction of polyorganosiloxane and perfluoropolyether having a functional group.

The used ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

It is possible to obtain the fluorine containing copolymers by polymerizing these monomers employing methods such as a solution polymerization method, a block polymerization method, an emulsion polymerization method or a suspension polymerization method.

The fluorine containing resins prior to coating are commercially available and it is possible to employ commercially available products. Listed as examples of the fluorine containing resins prior to coating are SAITOP (produced by Asahi Glass Co., Ltd.), TEFLON (a registered trade name) AD (produced by Du Pont), vinylidene polyfluoride, RUMIFRON (produced by Asahi Glass Co., Ltd.), and OPSTAR (produced by JSR Corp.).

The dynamic friction coefficient and contact angle to water of the low refractive index layer composed of crosslinked fluorine containing resins are in the range of 0.03-0.15 and in the range of 90-120 degrees, respectively.

In view of improving the mechanical strength, it is preferable that the low refractive index layer contains inorganic particles. As inorganic particles incorporated in the low refractive index layer, preferable are amorphous particles and metal oxides, nitrides, sulfides or holgenides are preferably used. Of these, specifically preferable are metal oxides. Examples of metal elements include: Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, PB and Ni. Of these, specifically preferable are Mg, Ca, B and Si. Inorganic particles containing two or more metal elements may also be used. Specifically preferable inorganic particles include silicon dioxide particles, namely, silica particles. The average particle diameter of inorganic particles is preferably 0.001 to 0.2 μm, and more preferably 0.005 to 0.05 μm. The particle diameters are preferably homogeneous (being monodisperse). When the particle diameters of the inorganic particles are too large, scattering of light may occur, resulting in loosing the transparency of the film, while, when the particle diameters are too small, coagulation of particles tends to occur, resulting in being difficult to synthesize and to handle the particles.

The content of inorganic particles is preferably 5 to 90% by weight, more preferably 10 to 70% by weight, and still more preferably 10 to 50% by weight, based on the total weight of the low refractive index layer. Further, it is preferable that inorganic particles are subjected to a surface treatment. Surface treatment methods include physical surface treatments such as a plasma discharge treatment and a corona discharge treatment, and a chemical surface treatment employing coupling agents. It is preferable to use the coupling agents. Preferably employed as coupling agents are organoalkoxy metal compounds (for example, a titanium coupling argent and a silane coupling agent). In cases in which inorganic particles are composed of silica, the treatment employing the silane coupling agent is are particularly effective.

Further, preferably employed as components for the low refractive index layer may be various types of sol-gel components. Preferably employed as such sol-gel components may be metal alcolates (being alcolates of silane, titanium, aluminum, or zirconium, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane, dialkyldialkoxysilane, diaryldialkoxysilane. Further, it is also preferable to use organoalkoxysilanes having various type of functional group (vinyltrialkoxysilane, methylvinyldialkoxysilane, γ-glycidyloxypropyltrialkoxysilane, γ-glycidyloxyoropylmethyldialkoxysilane, β-(3,4)epoxycyclohexyl)ethyltrialkoxysilane, γ-merthacryloyloxypropyltrialkoxysilane, γ-aminopropyltrialkoxysilane, γ-mercaptopropyltrialkoxysilane, and γ-chloropropyltrialkoxysilane), perfluoroalkyl group containing silane compounds (for example, (heptadecafluoro1,1,2,2-tetradecyl)triethoxysilane, 3,3,3-trifluoropropyltrimethoxy silane). In view of decreasing the refractive index of the layer and providing water repellency and oil repellency, it is preferable to particularly use fluorine containing silane compounds.

As a low refractive index layer, it is preferable to employ a layer which is prepared in such a manner that inorganic or organic particles are employed and micro-voids are formed among particles or in the particle. The average diameter of the particles is preferably 0.5-200 nm, more preferably 1-100 nm, still more preferably 3-70 nm, and most preferably 5-40 nm. Further, it is preferable that the particle diameter is as uniform (monodispersion) as possible.

Inorganic particles are preferably non-crystalline. The inorganic particles are preferably composed of metal oxides, nitrides, sulfides or halides, are more preferably composed of metal oxides or metal halides, but are most preferably composed of metal oxides or metal fluorides. Preferred as metal atoms are Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Ob and Ni. Of these, more preferred are Mg, Ca, B and Si. Inorganic compounds incorporating two types of metal may be employed. Specific examples of preferred inorganic compounds include $SuO_2$ or $MgF_2$, and $SiO_2$, namely, silica, is specifically preferred.

It is possible to form particles having micro-voids in the interior of an inorganic particle, for example, by crosslinking silica molecules. When silica molecules undergo crosslinking, the resulting volume decreases whereby a particle becomes porous. It is possible to directly synthesize micro-void containing (porous) inorganic particles as a dispersion, employing the sol-gel method (described in JP-A Nos. 53-112732 and 57-9051) and the deposition method (described in Applied Optics, Volume 27, page 3356 (1988)). Alternatively, it is also possible to obtain a dispersion in such a manner that powder prepared by a drying and precipitation method is mechanically pulverized. Commercially available porous inorganic particles (for example, $SiO_2$ sol) may be employed. In order to form a low refractive index layer, it is preferable that these inorganic particles are employed in the state dispersed in a suitable medium. Preferred as media are water, alcohol (for example, methanol, ethanol, and isopropyl alcohol), and ketone (for example, methyl ethyl ketone and methyl isobutyl ketone).

It is also preferable that organic particles are non-crystalline and are polymer particles which are synthesized by the polymerization reaction (for example, an emulsion polymerization method) of monomers. It is preferable that the polymers of organic particles incorporate fluorine atoms. The ratio of fluorine atoms in polymers is preferably 35-80 percent by weight, but is more preferably 45-75 percent by weight. Further, it is preferable that micro-voids are formed in the organic particle in such a manner that particle forming polymers undergo crosslinking so that a decrease in the volume forms micro-voids. In order that particle forming polymers undergo crosslinking, it is preferable that at least 20 mol percent of monomers to synthesize a polymer are multifunctional monomers. The ratio of the multifunctional monomers is more preferably 30-80 mol percent, but is most preferably 35-50 mol percent. Listed as examples of fluorine containing monomers employed to synthesize the above fluorine containing polymers are fluoroolefins (for example, fluoroethylene, vinylidene fluoride, tetrafluoroethylene, hexafluoropropylene, and perfluoro-2,2-dimethyl-1,3-dioxol), as well as fluorinated alkyl esters of acrylic acid or methacrylic acid and fluorinated vinyl ethers. Copolymers of monomers with and without fluorine atoms may be employed. Listed as examples of monomers without fluorine atoms are olefins (for example, ethylene, propylene, isoprene, vinyl chloride, and vinylidene chloride), acrylates (for example, methyl acrylate, ethyl acrylate, and 2-ethylhexyl acrylate), methacrylates (for example, ethyl methacrylate and butyl methacrylate), styrenes (for example, styrene, vinyltoluene, and α-methylstyrene), vinyl ethers (for example, methyl vinyl ether), vinyl esters (for example, vinyl acetate and vinyl propionate), acrylamides (for example, N-tert-butylacrylamide and N-cyclohexylacrylamide), methacrylamides, and acrylonitriles. Listed as examples of multifunctional monomers are dienes (for example, butadiene and pentadiene), esters of polyhydric alcohol with acrylic acid (for example, ethylene glycol diacrylate, 1,4-cyclohexane diacrylate, and dipentaerythritol hexaacrylate), esters of polyhydric alcohol with methacrylic acid (for example, ethylene glycol dimethacrylate, 1,2,4-cyclohexane tetramethacrylate, and pentaerythritol tetramethacrylate), divinyl compounds (for example, divinylcyclohexane and 1,4-divinylbenzene), divinylsulfone, and bisacrylamides (for example, methylenebisacrylamide) and bismethacrylamides.

It is possible to form micro-voids among particles by piling at least two particles. Incidentally, when spherical particles (completely monodispersed) of an equal diameter are subjected to closest packing, micro-voids at a 26 percent void ratio by volume are formed among particles. When spherical particles of an equal diameter are subjected to simple cubic packing, micro-voids at 48 percent void ratio by volume are formed among particles. In a practical low refractive index layer, the void ratio significantly shifts from the theoretical value due to the distribution of diameter of the particles and the presence of voids in the particle. As the void ratio increases the refractive index of the low refractive index layer decreases. When micro-voids are formed by piling particles, it is possible to easily control the size of micro-voids among particles to an appropriate value (being a value minimizing scattering light and resulting in no problems of the strength of the low refractive index layer) by adjusting the diameter of particles. Further, by making the diameter of particles uniform, it is possible to obtain an optically uniform low refractive index layer of the uniform size of micro-voids among particles. By doing so, though the resulting low refractive index layer is microscopically a micro-void containing porous layer, optically or macroscopically, it is possible to make it a uniform layer. It is preferable that micro-voids among particles are confined in the low refractive index layer employing particles and polymers. Confined voids exhibits an advantage such that light scattering on the surface of a low refractive index layer is decreased compared to the voids which are not confined.

By forming micro-voids, the macroscopic refractive index of the low refractive index layer becomes lower than the total refractive index of the components constituting the low refractive index layer. The refractive index of a layer is the sum of the refractive indexes per volume of layer constituting components. The refractive index value of the constituting components such as particles or polymers of the low refractive index lay is larger than 1, while the refractive index of air is 1.00. Due to that, by forming micro-voids, it is possible to obtain a low refractive index layer exhibiting significantly lower refractive index.

It is preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles. The polymers which are combined with the surface processing agents in (1) are preferably the shell polymers of (2) or binder polymers of (3). It is preferable that the polymers of (2) are formed around the particles employing a polymerization reaction prior to preparation of the low refractive index layer liquid coating composition. It is preferable that the polymers of (3) are formed employing a polymerization reaction during or after coating of the low refractive index layer while adding their monomers to the above low refractive index layer coating composition. It is preferable that at least two of (1), (2), and (3) or all are combined and employed. Of these, it is particularly preferable to practice the combination of (1) and (3) or the combination of (1), (2), and (3). (1) surface treatment, (2) shell, and (3) binder will now successively be described in that order.

(1) Surface Treatments

It is preferable that particles (specifically, inorganic particles) are subjected to a surface treatment to improve affinity with polymers. These surface treatments are classified into a physical surface treatment such as a plasma discharge treatment or a corona discharge treatment and a chemical surface treatment employing coupling agents. It is preferable that the chemical surface treatment is only performed or the physical surface treatment and the chemical surface treatment are performed in combination. Preferably employed as coupling agents are organoalkoxymetal compounds (for example, titanium coupling agents and silane coupling agents). In cases in which particles are composed of $SiO_2$, it is possible to particularly effectively affect a surface treatment employing the silane coupling agents. Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltriethoxysilane, N-β-(aminoethyl)-γ-aminopropyltrimethoxysilane, and β-cyanoethyltriethoxysilane.

Further, examples of silane coupling agents having two alkyl substituents for silicon include: dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylorethyldimethoxysilane, γ-mercaptopropylmethyldiethoxysilane, γ-aminopropylmethyldimethoxysilane, γ-aminopropyldiethoxysilane, methylvinyldimethoxysilane, and methylvinyldiethoxysilnae.

Of these, preferred are vinyltrimethoxysilane, vinyltriethoxysilane, vinylacetoxysilane, vinyltrimethoxethoxyysilane, γ-acryloyloxypropylmethoxysilane, and γ-methacryloyloxypropylmethoxysilane which have a double bond in the molecule, as well as γ-acryloyloxypropylmethyldimethoxysilane, γ-acryloyloxypropyldiethoxysilane, γ-methacryloyloxypropylmethyldimethoxysilane, γ-methacryloyloxypropylmethyldiethjoxysilane, methylvinyldimethoxysilane, and methylvinyldiethaoxysilane which have two alkyl substituents for silicon. Of these, particularly preferred are γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane, and γ-methacryloyloxypropylmethyldiethoxysilane.

At least two types of coupling agents may simultaneously be employed. In addition to the above silane coupling agents, other silane coupling agents may be employed. Listed as other silane coupling agents are alkyl esters of ortho-silicic acid (for example, methyl orthosilicate, ethyl orthosilicate, n-propyl orthosilicate, i-propyl orthosilicate, n-butyl orthosilicate, sec-butyl orthosilicate, and t-butyl orthosilicate) and hydrolyzed products thereof. It is possible to practice a surface treatment employing coupling agents in such a manner that coupling agents are added to a particle dispersion and the resulting dispersion is allowed to stand at room temperature-60° C. for several hours-10 days. In order to promote the surface treatment reaction, added to the above dispersion may be inorganic acids (for example, sulfuric acid, hydrochloric acid, nitric acid, chromic acid, hypochlorous acid, boric acid, orthosilicic acid, phosphoric acid, and carbonic acid); organic acids (for example, acetic acid, polyacrylic acid, benzenesulfonic acid, phenol, and polyglutamic acid), or salts thereof (for example, metal salts and ammonium salts); and metal chelate compounds of, for example, alminum, titanium or zirconium. Examples of the metal chelate compounds include: zirconium chelate compounds, for example, tri-n-butoxy(ethylacetoacetate)zirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; titanium chelate compounds, for example, diisopropoxybis(ethylacetoacetate)titanium, diisopropoxybis(acetylacetate)titanium, diisopropoxybis(acetylacetone)titanium; and aluminum chelate compounds, for example, diisopropoxyethylacetoacetatealminum, diisopropoxyacetylacetonatoalminum, isopropoxybis(ethylacetoacetate)alminum, isopropoxybis(acetylacetonato)alminum, tris(ethylacetoacetate)alminum, tris(acetylacetonato)aluminum and monoacetylacetonatobis(ethylacetoacetate) alminum. Of these, preferable are: tri-n-butoxy (ethylacetoacetate)zirconium, diisopropoxybis(acetylacetonato)titanium, diisopropoxyethylacetoacetatealminum, and monoacetylacetonatobis(ethylacetoacetate)alminum. These metal chelate compounds may be used alone or may be used in combination of two or more compounds. Partially hydrolyzed compounds of these metal chelate compounds may also be utilized.

(2) Shell

Shell forming polymers are preferably polymers having a saturated hydrocarbon as a main chain. Polymers incorporating fluorine atoms in the main chain or the side chain are preferred, while polymers incorporating fluorine atoms in the side chain are more preferred. Acrylates or methacrylates are preferred and esters of fluorine-substituted alcohol with polyacrylic acid or methacrylic acid are most preferred. The refractive index of shell polymers decreases as the content of fluorine atoms in the polymer increases. In order to lower the refractive index of a low refractive index layer, the shell polymers incorporate fluorine atoms in an amount of preferably 35-80 percent by weight, but more preferably 45-75 percent by weight. It is preferable that fluorine containing polymers are synthesized via the polymerization reaction of fluorine atom containing ethylenically unsaturated monomers. Listed as examples of fluorine atom containing ethylenically unsaturated monomers are fluorolefins (for example, fluoroethylene, vinylidene fluoride, tetrafluoroethylene, hexafluoropropylene, perfluoro-2-dimethyl-1,3-dixol), fluorinated vinyl ethers and esters of fluorine substituted alcohol with acrylic acid or methacrylic acid.

Polymers to form the shell may be copolymers having repeating units with and without fluorine atoms. It is preferable that the units without fluorine atoms are prepared employing the polymerization reaction of ethylenically unsaturated monomers without fluorine atoms. Listed as examples of ethylenically unsaturated monomers without fluorine atoms are olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tetrabutylacrylamide and N-cyclohexylacrylamide), as well as methacrylamide and acrylonitrile.

In the case of (3) in which binder polymers described below are simultaneously used, a crosslinking functional group may be introduced into shell polymers and the shell polymers and binder polymers are chemically bonded via crosslinking. Shell polymers may be crystalline. When the glass transition temperature (Tg) of the shell polymer is higher than the temperate during the formation of a low refractive index layer, micro-voids in the low refractive index layer are easily maintained. However, when Tg is higher than the temperature during formation of the low refractive index layer, minute particles are not fused and occasionally, the resulting low refractive index layer is not formed as a continuous layer (resulting in a decrease in strength). In such a case, it is desirous that the low refractive index layer is formed as a continuous layer simultaneously employing the binder polymers of (3). A polymer shell is formed around the minute particle, whereby a minute core/shell particle is obtained. A core composed of a minute inorganic particle is incorporated preferably 5-90 percent by volume in the minute core/shell particle, but more preferably 15-80 percent by volume. At least two types of minute core/shell particle may be simultaneously employed. Further, inorganic particles without a shell and core/shell particles may be simultaneously employed.

(3) Binders

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenically unsaturated monomers. In order to prepare crosslinked binder polymers, it is preferable to employ monomers having at least two ethylenically unsaturated groups. Listed as examples of monomers having at least two ethylenically unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides. It is preferable that polymers having polyether as a main chain are synthesized employing a ring opening polymerization reaction. A crosslinking structure may be introduced into binder polymers employing a reaction of crosslinking group instead of or in addition to monomers having at least two ethylenically unsaturated groups. Listed as examples of the crosslinking functional groups are an isocyanate group, an epoxy group, an aziridine group, an oxazoline group, an aldehyde group, a carbonyl group, a hydrazine group, a carboxyl group, a methylol group, and an active methylene group. It is possible to use, as a monomer to introduce a crosslinking structure, vinylsulfonic acid, acid anhydrides, cyanoacrylate derivatives, melamine, ether modified methylol, esters and urethane. Functional groups such as a block isocyanate group, which exhibit crosslinking properties as a result of the decomposition reaction, may be employed. The crosslinking groups are not limited to the above compounds and include those which become reactive as a result of decomposition of the above functional group. Employed as polymerization initiators used for the polymerization reaction and crosslinking reaction of binder polymers are heat polymerization initiators and photopolymerization initiators, but the photopolymerization initiators are more preferred. Examples of photopolymerization initiators include acetophenones, benzoins, benzophenones, phosphine oxides, ketals, antharaquinones, thioxanthones, azo compounds, peroxides, 2,3-dialkyldiones, disulfide compounds, fluoroamine compounds, and aromatic sulfoniums. Examples of acetophenones include 2,2-diethoxyacetophenone, p-dimethylacetophenone, 1-hydroxydimethyl phenyl ketone, 1-dihydroxycyclohexyl phenyl ketone, 2-methyl-4-methylthio-2-morpholinopropiophene, and 2-benzyl-2-dimethylamino-1-(4-morpholinophenyl)-butanone. Examples of benzoins include benzoin ethyl ether and benzoin isopropyl ether. Examples of benzophenones include benzophenone, 2,4-dichlorobenzophenone, 4,4-dichlorobenzophenone, and p-chlorobenzophenone. An example of phosphine oxides includes 2,4,6-trimethylbenzoyldiphenylphosphine oxide.

It is preferable that binder polymers are formed in such a manner that monomers are added to a low refractive index layer liquid coating composition and the binder polymers are formed during or after coating of the low refractive index layer utilizing a polymerization reaction (if desired, further crosslinking reaction). A small amount of polymers (for example, polyvinyl alcohol, polyoxyethylene, polymethyl methacrylate, polymethyl acrylate, diacetyl cellulose, triacetyl cellulose, nitrocellulose, polyester, and alkyd resins) may be added to the low refractive index layer liquid coating composition. As a preferable example of an antireflection film, an antireflection film has a high refractive index layer having a refractive index higher than that of the transparent substrate film and a low refractive index layer having a refractive index lower than that of the transparent substrate film, wherein the high refractive index layer is formed by applying a coating liquid containing the following (a) to (c) followed by heat treating, and the low refractive index layer is formed by applying a coating liquid containing the following (d) and (e) followed by heat treating: (a) metal oxide particles having an average particle diameter of 10 to 200 nm; (b) a metal compound; (c) an actinic ray curable resin; (d) an organosilicon compound represented by Formula (1), or a hydrolyzed compound or a polycondensed compound thereof; and (e) hollow silica particles having an outside shell and porous or vacant inside.

Formula (1) Si(OR)4 (in the Formula, R represents an alkyl group preferably having 1 to 4 carbon atoms)

<High Refractive Index Layer>

(Metal oxide Particles of High Refractive Index Layer)

Metal oxide particles are contained in a high refractive index layer according to the present invention. The type of metal oxide particles is not specifically limited and utilized can be metal oxide provided with at least one element selected from Ti, Zr, Sn, Sb, Cu, Fe, Mn, Pb, Cd, As, Cr, Hg, Zn, Al, Mg, Si, P and S; and these metal oxide particles may be doped with a tiny amount of an atom of such as Al, In, Sn, Sb, Nb, a halogen element and Ta. Further, mixtures thereof can be also utilized. In the present invention, particularly, preferably utilized as a primary component are metal oxide particles of one type selected from zirconium oxide, antimony oxide, tin oxide, zinc oxide, indium tin oxide (ITO), tin oxide doped with antimony (ATO) and zinc antimonate and specifically preferable is indium tin oxide (ITO).

An average particle diameter of primary particles of these metal oxide particles is preferably in a range of 10-200 nm and specifically preferably in a range of 10-150 nm. An average primary particle diameter of metal oxide particles is determined through observation with an electron microscope, for example, a transmission electron microscope (TEM). When the particle diameter is excessively small, aggregation is liable resulting in deteriorating dispersibility. While, when the particle diameter is excessively large, haze is extremely increased, and it is unfavorable. The shape of metal oxide particles is preferably a rice grain form, a spherical form, a cubic form, a corn form, a needle form or an irregular form.

In particular, a refractive index of a high refractive index layer is preferably higher than that of transparent substrate film as a support and in a range of 1.50-1.70, based on measurement at 23° C. with a wavelength of 550 nm. Since means to adjust a refractive index of a high refractive index layer are primarily the type of metal oxide particles and the addition amount, a refractive index of metal oxide particles is preferably 1.80-2.60 and more preferably 1.85-2.50.

Metal oxide particles may be surface treated with an organic compound. By modifying the surface of metal oxide particles with an organic compound, dispersion stability in an organic solvent is improved and control of a dispersed particle diameter becomes easy as well as it is also possible to restrain aggregation and precipitation due to aging. Therefore, the amount of surface modification with an organic compound is 0.1-5 weights and more preferably 0.5-3 weight %, against metal oxide particles. Specific examples of an organic substance utilized for the surface treatment include polyol, alkanol amine, stearic acid, a silane coupling agent and a titanate coupling agent. Among them, a silane coupling agent described later is preferred. Two or more types of surface treatments may be utilized in combination.

A thickness of a high refractive index layer containing the aforesaid metal oxide particles is preferably 5 nm-1 µm, more preferably 10 nm-0.2 µm and most preferably 30 nm-0.1 µm.

The ratio of metal oxide particles utilized in the antireflection film to a binder such as ionizing radiation curable resin described later differs depending on such as the type and particle diameter of metal oxide particles, however, the ratio is preferably approximately 1/2-2/1 based on a volume ratio of the former to the latter.

The content of metal oxide particles utilized in the present invention is preferably 5-85 weights in a high refractive index layer, more preferably 10-80 weight % and most preferably 20-75 weight %.

The above-described metal oxide particles are supplied to a coating solution, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In the present invention, further, metal oxide particles having a core/shell structure may be incorporated. One layer of a shell may be formed on the circumference of a core or plural layers of shells may be formed to further improve light resistance. It is preferable to completely cover the core with a shell.

As a core, utilized can be titanium oxide (such as a rutile type, an anatase type and an amorphous type), zirconium oxide, zinc oxide, cerium oxide, indium oxide doped with tin and tin oxide doped with antimony, however, titanium oxide of a rutile type is preferably utilized as a primary component.

A shell preferably utilizes an inorganic compound other than titanium oxide as a primary component and is formed from metal oxide or metal sulfide. For example, inorganic compounds comprised of such as silicon dioxide (silica), aluminum oxide (alumina), zirconium oxide, zinc oxide, tin oxide, antimony oxide, indium oxide, iron oxide and zinc sulfide as a primary component can be utilized. Among them, preferably utilized are alumina, silica and zirconia (zirconium oxide). Further, mixtures thereof are also preferable.

The coverage of a shell against a core is 2-50 weight %, preferably 3-40 weight % and furthermore preferably 4-25 weight %, based on a mean coverage. When the coverage of a shell is large, refractive index of particles will decrease, while when the coverage is excessively small, light resistance will be deteriorated. Two or more types of inorganic particles may also be utilized in combination.

As titanium oxide to form a core, one prepared by a liquid phase method or a gas phase method can be utilized. Further, as a method to form a shell around a core, utilized can be a method described in such as U.S. Pat. No. 3,410,708, Examined Japanese Patent Application Publication No. 58-47061, U.S. Pat. Nos. 2,885,366 and 3,437,502, British Patent No. 1,134,249, U.S. Pat. No. 3,383,231, British Patent Nos. 2,629,953 and 1,365,999.

(Metal Compound)

As metal compounds utilized in the present invention, compounds represented by following Formula (2) or chelate compounds thereof can be utilized.

$$A_nMB_{x-n}$$ Formula (2)

wherein, M represents a metal atom, A represents a functional group which can be hydrolyzed, or a hydrocarbon group provided with a functional group which can be hydrolyzed, and B represents an atomic group which has made a covalent or ionic bond with metal atom M. x represents a valence of metal atom M and n represents an integer of not less than 2 and not more than x.

A functional group A capable of being hydrolyzed includes such as an alkoxy group, a halogen atom such as chlorine atom, an ester group and an amido group. Metal compounds belonging to above formula (2) include alkoxide provided with at least two alkoxy groups, which directly bond to the metal atom, or chelate compounds thereof. Preferable metal compounds include titanium alkoxide, zirconium alkoxide or chelate compounds thereof. Titanium alkoxide gives a rapid reaction rate and a high refractive index as well as easy handling, however, it may deteriorate light resistance due to the photocatalitic function when a large amount thereof is added. Zirconium alkoxide has a high refractive index; however, since it is liable to be milky-whitened, care should be taken of such as dew point control at the time of coating. Further, since titanium alkoxide has an effect to accelerate the reaction of ultraviolet curable resin and metal alkoxide, it is possible to improve physical properties of coated film even with a small amount of addition.

Examples of titanium alkoxide includes: tetramethoxy titanium, tetraethoxy titanium, tetra-iso-propoxy titanium, tetra-n-propoxy titanium, tetra-n-butoxy titanium, tetra-sec-butoxy titanium and tetra-tert-butoxy titanium.

Examples of zirconium alkoxide includes: tetramethoxy zirconium, tetraethoxy zirconium, tetra-iso-propoxy zirconium, tetra-n-propoxy zirconium, tetra-n-butoxy zirconium, tetra-sec-butoxy zirconium and tetra-tert-butoxy zirconium.

A preferable chelating agent, which forms a chelate compound by coordinating to a metal compound, includes alkanol amines such as diethanol amine and triethanol amine; glycols such as ethylene glycol, diethylene glycol and propylene glycol; acetylacetone and ethyl acetoacetate; having a molecular weight of not more than 10,000. By utilizing these chelating agents, a chelate compound, which is stable against such as mixing of water content and excellent in a bolstering effect of coated layer, can be formed.

The addition amount of a metal compound is preferably adjusted to 0.3-5 weight % based on the content of metal oxide arising from said metal compound contained in a high refractive index layer. Scratch resistance is not sufficient when the content is less than 0.3 weight %, while light resistance tends to be deteriorated when the content is over 5 weight %.

(Ionization Radiation Curable Resin)

Ionization radiation curable resin is added as a binder for metal oxide particles to improve film forming capability and physical properties of coated film. As ionization radiation curable resin, utilized can be monomer or oligomer provided with at least two functional groups which generate a polymerization reaction directly with irradiation of ionization radiation such as ultraviolet rays and electron rays or indirectly with a function of a photo-polymerization initiator. The functional group includes a group having an unsaturated double bond such as a (meth)acryloyloxy group, an epoxy group and silanol group. Among them, radical polymerizing monomer or oligomer which has at least two unsaturated double bonds is preferably utilized. A photopolymerization initiator may be appropriately employed in combination. Such ionization radiation curable resin includes a polyfunctional acrylate compound, and preferably is a compound selected from a group comprising pentaerythritol polyfunctional acrylate, dipentaerythritol polyfunctional acrylate, pentaerythritol polyfunctional methacrylate and dipentaerythritol polyfunctional methacrylate. Herein, a polyfunctional acrylate compound is a compound provided with at least two acryloyloxy groups and/or methacryloyloxy groups.

Examples of a monomer of a polyfunctional acrylate compound include: ethylene glycol diacrylate, diethylene glycol diacrylate, 1,6-hexanediol diacrylate, neopentyl glycol diacrylate, trimethylolpropane triacrylate, trimethylolethane triacrylate, tetramethylolmethane triacrylate, tetramethylolmethane tetraacrylate, pentaglycelol triacrylate, pentaerythritol diacrylate, pentaerythritol triacrylate, pentaerythritol tetraacrylate, glycerin triacrylate, dipentaerythritol triacrylate, dipentaerythritol tetraacrylate, dipentaerythritol pentaacrylate, dipentaerythritol hexaacrylate, tris(acryloyloxyethyl)isocyanulate, ethylene glycol dimethacrylate, diethylene glycol dimethacrylate, 1,6-hexanediol dimethacrylate, neopentyl glycol dimethacrylate, trimethylolpropane trimethacrylate, trimethylolethane trimethacrylate, tetramethylolmethane trimethacrylate, tetramethylolmethane tetramethacrylate, pentaglycelol trimethacrylate, pentaerythritol dimethacrylate, pentaerythritol trimethacrylate, pentaerythritol tetramethacrylate, glycerin trimethacrylate, dipentaerythritol trimethacrylate, dipentaerythritol tetramethacrylate, dipentaerythritol pentamethacrylate and dipentaerythritol hexamethacrylate. These compounds each are utilized alone or in combination of at least two types. Further, oligomer such as dimmer or trimer of the above-described monomer may also be utilized.

The addition amount of ionization radiation curable resin is preferably not less than 15 weight % and not more than 50 weight % in the solid content, in case of a high refractive index composition.

To accelerate curing of ionization radiation curable resin according to the present invention, it is preferable to incorporate a photo-polymerization initiator and an acrylic compound having two or more unsaturated bonds, which is capable of polymerization, in a molecule, at a weight ratio of 3:7-1:9.

Specific examples of a photo-polymerization initiator include: acetophenone, benzophenone, hydroxybenzophenone, Michler's ketone, α-amyloxime ester and thioxanthone; and derivatives thereof, however, the photo-polymerization initiator is not limited thereto.

(Solvent)

Examples of an organic solvent utilized for coating of a high refractive index layer of the present invention include: alcohols (such as methanol, ethanol, propanol, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thiodiglycol), polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether and propylene glycol monophenyl ehter), amines (such as ethanol amine, diethenol amine, triethenol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentametyldiethylene triamine and tetramethylpropylene diamine), amides (such as formamide, N,N-dimethyl formamide and N,N-dimethyl acetoamide), heterocyclic rings (such as 2-pyrrolidone, N-methyl-2-pyrrolidone, cyclohexyl pyrrolidone, 2-oxazoline and 1,3-dimethyl-2-imidazolidinone), sulfoxides (such as dimethylsulfoxide), sulfones (such as sulforane), urea, acetonitrile and acetone, however, alcohols, polyhydric alcohols and polyhydric alcohol ethers are specifically preferred.

<Low Refractive Index Layer>

The low refractive index layer forming composition utilized in the antireflection film of the present invention contains (d) an organosilicon compound, which is represented by Formula (1), a hydrolyzed product thereof or a polycondensation product thereof and (e) hollow silica particles having an outer shell and porous or vacant inside, which is an essential component.

$Si(OR)_4$ (wherein, R represents an alkyl group and preferably an alkyl group having 1-4 carbon atoms)    Formula (1)

In addition to this, a solvent and appropriately such as a silane coupling agent, a hardener and a surfactant may be incorporated.

[Hollow Silica Particles]

Hollow silica particles, the interior of which is porous or hollow, provided with an outer shell layer represented by aforesaid (e), will now be explained.

Hollow silica particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of 2/3-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, $NaF$, $NaAlF_6$ and $MgF$. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased.

Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of JP-A No. 7-133105, is suitably applied. Specifically, in the case of a complex particle being comprised of silica and an inorganic compound other than silica, the hollow particle is manufactured according to the following first-third processes.

First Process: Preparation of Porous Particle Precursor

In the first process, alkaline aqueous solutions of a silica raw material and of an inorganic compound raw material other than silica are independently prepared or a mixed aqueous solution of a silica raw material and an inorganic compound raw material other than silica is prepared, in advance, and this aqueous solution is gradually added into an alkaline aqueous solution having a pH of not less than 10 while stirring depending on the complex ratio of the aimed complex oxide, whereby a porous particle precursor is prepared.

As a silica raw material, silicate of alkali metal, ammonium or organic base is utilized. As silicate of alkali metal, utilized are sodium silicate (water glass) and potassium silicate. Organic base includes quaternary ammonium salt such as tetraethylammonium salt; and amines such as monoethanolamine, diethanolamine and triethanolamine. Herein, an alkaline solution, in which such as ammonia, quaternary ammonium hydroxide or an amine compound is added to a silicic acid solution, is also included in silicate of ammonium or silicate of organic base.

Further, as a raw material of an inorganic compound other than silica, utilized is an alkali-soluble inorganic compound. Specific examples include oxoacid of an element selected from such as Al, B, Ti, Zr, Sn, Ce, P, Sb, Mo, Zn and W; alkali metal salt, alkaline earth metal salt, ammonium salt and quaternary ammonium salt of said oxoacid. More specifically, sodium alminate, sodium tetraborate, ammonium zirconyl carbonate, potassium antimonite, potassium stannate, sodium alminosilicate, sodium molybdate, cerium ammonium nitrate and sodium phosphate are suitable.

The pH value of a mixed aqueous solution changes simultaneously with addition of these aqueous solutions, however, operation to control the pH value into a specific range is not necessary. The aqueous solution finally takes a pH value determined by the types and the mixing ratio of inorganic oxide. At this time, the addition rate of an aqueous solution is not specifically limited. Further, dispersion of a seed particle may be also utilized as a starting material at the time of manufacturing of complex oxide particles. Said seed particles are not specifically limited, however, particles of inorganic oxide such as $SiO_2$, $Al_2O_3$, $TiO_2$ or $ZrO_2$ or complex oxide thereof are utilized, and generally sol thereof can be utilized. Further, a porous particle precursor dispersion prepared by the aforesaid manufacturing method may be utilized as a seed particle dispersion. In the case of utilizing a seed particle dispersion, after the pH of a seed particle dispersion is adjusted to not lower than 10, an aqueous solution of the aforesaid compound is added into said seed particle dispersion while stirring. In this case pH control of dispersion is not necessarily required. By utilizing seed particles in this manner, it is easy to control the particle diameter of prepared particles and particles having a uniform size distribution can be obtained.

A silica raw material and an inorganic compound raw material, which were described above, have a high solubility at alkaline side. However, when the both are mixed in pH range showing this high solubility, the solubility of an oxoacid ion such as a silicic acid ion and an aluminic acid ion will decrease, resulting in precipitation of these complex products to form particles or to be precipitated on a seed particle causing particle growth. Therefore, at the time of precipitation and growth of particles, pH control in a conventional method is not necessarily required.

A complex ratio of silica and an inorganic compound other than silica is preferably in a range of 0.05-2.0 and more preferably of 0.2-2.0, based on mole ratio $MO_x/SiO_2$, when an inorganic compound other than silica is converted to oxide ($MO_x$). In this range, the smaller is the ratio of silica, increases the pore volume of porous particles. However, a pore volume of porous particles barely increases even when the mole ratio is over 2.0. On the other hand, a pore volume becomes small when the mole ratio is less than 0.05. In the case of preparing hollow particles, mole ratio of $MO_x/SiO_2$ is preferably in a range of 0.25-2.0.

Second Process: Removal of Inorganic Compounds Other than Silica from Porous Particles In the second process, at least a part of inorganic compounds other than silica (elements other than silica and oxygen) is selectively removed from the porous particle precursor prepared in the aforesaid first process. As a specific removal method, inorganic compounds in a porous particle precursor are dissolved and removed by use of such as mineral acid and organic acid, or by being contacted with cationic ion-exchange resin.

Herein, a porous particle precursor prepared in the first process is a particle having a network structure in which silica and an inorganic compound element bond via oxygen. In this manner, by removing inorganic compounds (elements other than silica and oxygen) from a porous particle precursor, porous particles, which are more porous and have a large pore volume, can be prepared. Further, hollow particles can be prepared by increasing the removal amount of inorganic compound (elements other than silica and oxygen) from a porous particle precursor.

Further, in advance to removal of inorganic compounds other than silica from a porous particle precursor, it is preferable to form a silica protective film by adding a silicic acid solution which contains a silane compound having a fluorine substituted alkyl group, and is prepared by dealkalization of alkali metal salt of silica; or a hydrolyzable organosilicon compound, in a porous particle precursor dispersion prepared in the first process. The thickness of a silica protective film is 0.5-15 nm. Herein, even when a silica protective film is formed, since the protective film in this process is porous and has a thin thickness, it is possible to remove the aforesaid inorganic compounds other than silica from a porous particle precursor.

By forming such a silica protective film, the aforesaid inorganic compounds other than silica can be removed from a porous particle precursor while keeping the particle shape as it is. Further, at the time of forming a silica cover layer described later, the pore of porous particles is not blocked by a cover layer, and thereby the silica cover layer described later can be formed without decreasing the pore volume. Herein, when the amount of inorganic compound to be removed is small, it is not necessary to form a protective film because the particles will never be broken.

Further, in the case of preparation of hollow particles, it is preferable to form this silica protective film. At the time of preparation of hollow particles, a hollow particle precursor, which is comprised of a silica protective film, a solvent and insoluble porous solid within said silica protective film, is obtained when inorganic compounds are removed, and hollow particles are formed, by making a particle wall from a formed cover layer, when the cover layer described later is formed on said hollow particle precursor.

The amount of a silica source added to form the aforesaid silica protective film is preferably in a range to maintain the particle shape. When the amount of a silica source is excessively large, it may become difficult to remove inorganic compounds other than silica from a porous particle precursor because a silica protective film becomes excessively thick. As a hydrolyzable organosilicon compound utilized to form a silica protective film, alkoxysilane represented by formula $R_nSi(OR')_{4-n}$ [R, R': a hydrocarbon group such as an alkyl group, an aryl group, a vinyl group and an acryl group; n=0, 1, 2 or 3] can be utilized. Fluorine-substituted tetraalkoxysilane, such as tetramethoxysilane, tetraethoxysilane and tetraisopropoxysilane, is specifically preferably utilized.

As an addition method, a solution, in which a small amount of alkali or acid as a catalyst is added into a mixed solution of these alkoxysilane, pure water and alcohol, is added into the aforesaid dispersion of porous particles, and silicic acid polymer formed by hydrolysis of alkoxysilane is precipitated on the surface of inorganic oxide particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of a porous particle precursor is water alone or has a high ratio of water to an organic solvent, it is also possible to form a silica protective film by use of a silicic acid solution. In the case of utilizing a silicic acid solution, a predetermined amount of a silicic acid solution is added into the dispersion and alkali is added simultaneously, to precipitate silicic acid solution on the porous particle surface. Herein, a silica protective film may also be formed by utilizing a silicic acid solution and the aforesaid alkoxysilane in combination.

Third Process: Formation of Silica Cover Layer

In the third process, by addition of such as a hydrolyzable organosilicon compound containing a silane compound provided with a fluorine substituted alkyl group, or a silicic acid solution, into a porous particle dispersion (into a hollow particle dispersion in the case of hollow particles), which is prepared in the second process, the surface of particles is covered with a polymer substance of such as a hydrolyzable organosilicon compound or a silicic acid solution to form a silica cover layer.

As a hydrolyzable organosilicon compound utilized for formation of a silica cover layer, alkoxysilane represented by formula $R_nSi(OR')_{4-n}$ [R, R': a hydrocarbon group such as an alkyl group, an aryl group, a vinyl group and an acryl group; n=0, 1, 2 or 3], as described before, can be utilized. Tetraalkoxysilane such as tetramethoxysilane, tetraethoxysilane and tetraisopropoxysilane are specifically preferably utilized.

As an addition method, a solution, in which a small amount of alkali or acid as a catalyst is added into a mixed solution of these alkoxysilane, pure water and alcohol, is added into the aforesaid dispersion of porous particles (a hollow particle precursor in the case of hollow particles), and silicic acid polymer formed by hydrolysis of alkoxysilane is precipitated on the surface of porous particles (a hollow particle precursor in the case of hollow particles). At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

In the case that a dispersion medium of porous particles (a hollow particle precursor in the case of hollow particles) is water alone or a mixed solution of water with an organic solvent having a high ratio of water to an organic solvent, it is also possible to form a cover layer by use of a silicic acid solution. A silicic acid solution is an aqueous solution of lower polymer of silicic acid which is formed by ion-exchange and dealkalization of an aqueous solution of alkali metal silicate such as water glass.

A silicic acid solution is added into a dispersion of porous particles (a hollow particle precursor in the case of hollow particles), and alkali is simultaneously added to precipitate silicic acid lower polymer on the surface of porous particles (a hollow particle precursor in the case of hollow particles). Herein, silicic acid solution may be also utilized in combination with the aforesaid alkoxysilane to form a cover layer. The addition amount of an organosilicon compound or a silicic acid solution, which is utilized for cover layer formation, is as much as to sufficiently cover the surface of colloidal particles and the solution is added into a dispersion of porous particles (a hollow particle precursor in the case of hollow particles) at an amount to make a thickness of the finally obtained silica cover layer of 1-20 nm. Further, in the case that the aforesaid silica protective film is formed, an organosilicon compound or a silicic acid solution is added at an amount to make a thickness of the total of a silica protective film and a silica cover layer of 1-20 nm.

Next, a dispersion of particles provided with a cover layer is subjected to a thermal treatment. By a thermal treatment, in the case of porous particles, a silica cover layer, which covers the surface of porous particles, becomes minute to prepare a dispersion of complex particles comprising porous particles covered with a silica cover layer. Further, in the case of a hollow particle precursor, the formed cover layer becomes minute to form a hollow particle wall, whereby a dispersion of hollow particles provided with a hollow, the interior of which is filled with a solvent, a gas or a porous solid, is prepared.

Thermal treatment temperature at this time is not specifically limited provided being so as to block micro-pores of a silica cover layer, and is preferably in a range of 80-300° C. At a thermal treatment temperature of lower than 80° C., a silica cover layer may not become minute to completely block the micro-pores or the treatment time may become long. Further, when a prolonged treatment at a thermal treatment temperature of higher than 300° C. is performed, particles may become minute and an effect of a low refractive index may not be obtained.

A refractive index of inorganic particles prepared in this manner is as low as less than 1.42. It is assumed that the refractive index becomes low because such inorganic particles maintain porous property in the interior of porous particles or the interior is hollow.

A content of hollow silica particles, the interior of which is porous or hollow, in a low refractive index layer is preferably 10-50 weight %. The content is preferably not less than 15 weight % to obtain an effect of a low refractive index, and a binder component become small to give insufficient layer strength when the content is over 50 weight %. The content is specifically preferably 20-50 weight %.

With respect to an organosilicon compound represented by aforesaid Formula (1), R in the formula represents an alkyl group having a carbon number of 1-4.

Specifically, tetraalkoxysilane such as tetramethoxysilane, tetraethoxysilane and tetraisopropoxysilane is preferably utilized.

As an addition method into a low refractive index layer, a solution, in which a small amount of alkali or acid as a catalyst is added into a mixed solution of these alkoxysilane, pure water and alcohol, is added into the aforesaid dispersion of hollow silica type particles, and silicic acid polymer formed by hydrolysis of alkoxysilane is precipitated on the surface of hollow silica type particles. At this time, alkoxysilane, alcohol and a catalyst may be simultaneously added into the dispersion. As an alkali catalyst, ammonia, hydroxide of alkali metal and amines can be utilized. Further, as an acid catalyst, various types of inorganic acid and organic acid can be utilized.

Further, in the present invention, silane compounds containing a fluorine substituted alkyl group, which are represented by following Formula (3), can also be incorporated in a low refractive index layer.

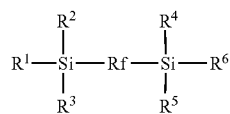

Formula (3)

Silane compounds containing a fluorine substituted alkyl group, which are represented by aforesaid Formula (3), will be now explained.

In the formula, $R^1$-$R^6$ represent an alkyl group having a carbon number of 1-16 and preferably of 1-4, a halogenated alkyl group having a carbon number of 1-6 and preferably of 1-4, an aryl group having a carbon number of 6-12 and preferably of 6-10, an alkylaryl group and an arylalkyl group, having a carbon number of 7-14 and preferably of 7-12, an alkenyl group having a carbon number of 2-8 and preferably of 2-6, an alkoxy group having a carbon number of 1-6 and preferably of 1-3, hydrogen atom or a halogen atom.

Rf represents —$(C_aH_bF_c)$—, "a" represents an integer of 1-12, "b+c" is "2a", and "b" and "c" each represent 0 or an integer of 1-24. As such Rf, a group, provided with a fluoroalkylene group and a alkylene group, is preferable. Specifically, such a fluorine-containing silicone compound includes such as methoxysilane compounds represented by $(MeO)_3SiC_2H_4C_2F_4C_2H_4Si(MeO)_3$, $(MeO)_3SiC_2H_4C_4F_8C_2H_4Si(MeO)_3$, $(MeO)_3SiC_2H_4C_6F_{12}C_2H_4Si(MeO)_3$, $(H_5C_2O)_3SiC_2H_4C_4F_8C_2H_4Si(H_5C_2O)_3$ and $(H_5C_2O)_3SiC_2H_4C_6F_{12}C_2H_4Si(H_5C_2O)_3$.

When a silane compound provided with a fluorine-containing alkyl group is incorporated as a binder, since the formed transparent film it self is provided with hydrophobicity, invasion by water content or chemicals such as acid and alkali into the transparent film is restrained even when the transparent film is not made sufficiently minute to be porous or have cracks or voids. Further, particles such as metal contained in the substrate surface or the underlying conductive layer will never react with water content or chemicals such as acid and alkali. Therefore, such transparent film is provided with an excellent chemical resistance.

Further, when a silane compound provided with a fluorine-containing alkyl group is incorporated as a binder, sliding property in addition to such hydrophobicity is excellent (contact resistance is low), therefore transparent film having an excellent scratch strength can be obtained. Further, when a binder contains a silane compound provided with a fluorine-containing alkyl group having such a constituent unit, it is possible to form transparent film having an excellent adhesion with a conductive layer, in the case of a conductive layer being arranged under the film, because shrinkage ratio of the binder is same as or nearly equal to that of the conductive layer. Further, at the time of thermal treatment of transparent film, a conductive layer will never peeled off due to difference of shrinkage rate to generate a portion without electrical contact in a transparent conductive layer. Therefore, sufficient conductivity as the whole film can be maintained.

Transparent film containing a silane compound provided with a fluorine-containing alkyl group, and hollow silica particles the interior of which is porous or hollow, provided with the aforesaid outer layer, can form transparent film having an excellent strength, such as film strength evaluated based on eraser strength or nail strength in addition to a strong scratch strength, as well as a high pencil hardness.

A silane coupling agent may be incorporated in a low refractive index layer according to the present invention. A silane coupling agent includes methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Further, examples of a silane coupling agent having two alkyl substituents against silicon include: dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Among them, vinylmethoxysilane, vinyltriethoxysilane, vinyltriacetoxysilane, vinyltrimethoxyethoxysilane, γ-acryloyloxypropyltrimethoxysilane and γ-methacryloyloxypropyltrimethoxysilane, which are provided with a double bond in a molecule; γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane, methylvinyldimethoxysilane and methylvinyldiethoxysilane as those having a 2-substituting alkyl group against silicon are preferable; and γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilaneare specifically preferable.

Two or more coupling agents may be utilized in combination. Other silane coupling agents in addition to the above-described silane coupling agents may be utilized. Other silane coupling agents include alkyl ester of orthosilicic acid (such as methyl orthosilicate, ethyl orthosilicate, n-propyl orthosilicate, i-propyl orthosilicate, n-butyl orthosilicate, sec-butyl orthosilicate and t-butyl orthosilicate) and hydrolyzed substances thereof.

Polymer utilized as another binder in a low refractive index layer includes such as polyvinyl alcohol, polyoxyethylene, polymethyl methacrylate, polymethyl acrylate, diacetyl cellulose, triacetyl cellulose, nitro cellulose, polyester and alkyd resin.

A low refractive index layer preferably contains a binder of 5-80 weight % as a whole. A binder is provided with a function to unite hollow silica particles and to maintain the structure of a low refractive index layer containing voids. The using amount of a binder is adjusted so as to maintain strength of a low refractive index layer without filling voids.

(Solvent)

A low refractive index layer according to the present invention preferably contains an organic solvent. Specific examples of an organic solvent include alcohol (such as methanol, ethanol, isopropanol, butanol and benzyl alcohol), ketone (such as acetone, methyl ethyl ketone, methyl isobutyl ketone and cyclohexanone), ester (such as methyl acetate, ethyl acetate, propyl acetate, butyl acetate, methyl formate, ethyl formate, propyl formate and butyl formate), aliphatic hydrocarbon (such as hexane and cyclohexane), halogenated hydrocarbon (such methylene chloride, chloroform and tetrachlorometane), aromatic hydrocarbon (such as benzene, toluene and xylene), amide (such as dimethyl formamide, dimethyl acetoamide and N-methylpyrrolidone), ether (such as diethyl ether, dioxane and tetrahydrofuran) and ether alcohol (such as 1-methoxy-2-propanol). Among them, specifically preferable are toluene, xylene, methyl ethyl ketone, methyl isobutyl ketone, cyclohexanone and butanol.

A solid concentration in a low refractive index layer coating composition is preferably 1-4 weight %, and uneven coating is hardly caused by setting said solid concentration to not more than 4 weigh % as well as a drying load is decreased by setting the concentration to not less than 1 weight %.

(Fluorine-Containing Surfactant, Silicone Oil or Silicone Surfactant)

In the present invention, a fluorine-containing surfactant, silicone oil or a silicone surfactant is preferably incorporated in the aforesaid hard coat layer, high refractive index layer and low refractive index layer. By containing the above-described surfactant, it is effective to restrain uneven coating and to improve antistaining property of the film surface.

Fluorine-containing surfactants are those comprising monomer, oligomer and polymer containing a perfluoroalkyl group, as a mother nucleus, and include derivatives of such as polyoxyethylene alkylether, polyoxyethylene alkylallylehter and polyoxyethylene.

As a fluorine-containing surfactant, products available on the market can be also utilized, and listed are Surflon "S-381", "S-382", "SC-101", "SC-102", "SC-103" and "SC-104" (all are manufactured by Asahi Glass Co., Ltd.); Fluorad "FC-431" and "FC-173" (all are manufactured by Fluoro Chemical-Sumitomo 3M Co., Ltd.); Eftop (fluoro surfactant) "EF352", "EF301" and "EF303" (all are manufactured by Shin-Akita Chemicals Co., Ltd. (JEMCO Inc.)); Schwego-Fluor "8035" and "8036" (all are manufacture by Schwegmann Co., Ltd.); "BM1000" and "BM1100" (all are manufactured B. M. Chemie Corp.) and Megafac "F-171" and "F-470" (all are manufactured by Dainippon Ink and Chemicals, Inc.).

A fluorine content ratio of a fluorine-containing surfactant in the present invention is 0.05-2% and preferably 0.1-1%. The above-described fluorine-containing surfactants may be utilized alone or in combination of at least two types, and may be utilized in combination with other surfactants.

Silicone oil or a silicone surfactant will now be explained.

Silicone oil utilized in the present invention can be roughly divided into straight silicone oil and modified silicone oil, depending on the type of an organic group bonding to a silicon atom. Straight silicone oil refers one to which a methyl group, a phenyl group and a hydrogen atom are bonded as a substituent. Modified silicone oil refers one having a constitutent portion which is secondarily derived from straight silicone oil. On the other hand, classification can be made according to reactivity of silicone oil. These will be summarized as follows.

Silicone Oil

1. Straight Silicone Oil 1-1. Non-Reactive Silicone Oil: Such as Dimethyl and Methylphenyl Derivatives 1-2. Reactive Silicone Oil: Such as Methyl/Hydrogen Substituted 2. Modified Silicone Oil Modified silicone oil is one formed by introducing various organic groups into dimethyl silicone oil.

2-1. Non-Reactive Silicone Oil: Such as Alkyl, Alkyl/Alalkyl, Alkyl/Polyether, Polyether and Higher Aliphatic Acid Ester Substituted Alkyl/alalkyl modified silicone oil is silicon oil in which a part of methyl groups of dimethyl silicone oil is substituted by a long-chain alkyl group or a phenylalkyl group.

Polyether modified silicone oil is a silicone type polymer surfactant in which a hydrophilic polyoxyalkylene is introduced into hydrophobic dimethylsilicone.

Higher fatty acid modified silicone oil is silicone oil in which a part of methyl groups of dimethylsilicone oil is substituted by higher aliphatic acid ester.

Amino modified silicone oil is silicone oil having a structure in which a part of methyl groups of the silicone oil is substituted by an amino alkyl group.

Epoxy modified silicone oil is silicone oil having a structure in which a part of methyl groups of the silicone oil is substituted by an alkyl group containing an epoxy group.

Carboxyl modified or alcohol modified silicone oil is silicone oil having a structure in which a part of methyl groups of the silicone oil is substituted by a carboxyl group or an alkyl group containing a hydroxide group.

2-2. Reactive Silicone Oil: Such as Amino, Epoxy, Carboxyl and Alcohol Substituted Among them, preferably added is polyether modified silicone oil. The number average molecular weight of polyether modified silicone oil is, for example, 1,000-100,000 and preferably 2,000-50,000. Drying property of film is decreased when the number average molecular weight is less than 1,000, while there is a tendency of hardly causing bleed out on the film surface when the number average molecular weight is over 100,000.

Specific products include such as L-45, L-9300, FZ-3704, FZ-3703, FZ-3720, FZ-3786, FZ-3501, FZ-3504, FZ-3705, FZ-3707, FZ-3710, FZ-3750, FZ-3760, FZ-3785 and Y-7499 of Nippon Unicar Co., Ltd; and KF96L, KF96, KF96H, KF99, KF54, KF965, KF968, KF56, KF995, KF351, KF352, KF353, KF354, KF355, KF615, KF618, KF945, KF6004 and FL100 of Shin-Etsu Chemical Co., Ltd.

A silicone surfactant utilized in the present invention is a surfactant in which a part of methyl groups of silicone oil is substituted by a hydrophilic group. The positions of substitution are such as a side chain, the both ends, one end and the both terminal side chains. As a hydrophilic group, utilized are such as polyether, polyglycerin, pyrrolidone, betaine, sulfate, phosphate and quaternary salt.

As a silicone surfactant, preferable is a nonionic surfactant in which a hydrophobic group is constituted of dimethylpolysiloxane and a hydrophilic group is constituted of polyoxyalkylene.

A nonionic surfactant generally refers to a surfactant not provided with a group which dissociate in an aqueous solution, however, is provided with a hydroxyl group of polyhydric alcohols as a hydrophilic group in addition to a hydrophobic group, and further with such as a polyalkylene chain (polyoxyethylene) as a hydrophilic group. Hydrophilic property becomes strong as the number of an alcoholic hydroxyl group increases and as the polyoxyalkylene chain (polyoxyethylene chain) becomes long. A nonionic surfactant according to the present invention is characterized by having dimethylpolysiloxane as a hydrophobic group.

By utilizing a nonionic surfactant constituted of dimethylpolysiloxane as a hydrophobic group and polyoxyalkylene as a hydrophilic group, unevenness is decreased and antistaining property of the film surface is improved, with respect to the aforesaid low refractive index layer. A hydrophobic group comprising polysiloxane is oriented on the surface to make the film surface being hardly contaminated. This effect cannot be obtained by other surfactants.

Specific examples of these nonionic surfactants include such as silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, manufactured by Nippon Unicar Co., Ltd.

Further, listed are such as SUPERSILWET SS-2801, SS-2802, SS-2803, SS-2804 and SS-2805.

Further, a structure of a nonionic type surfactant, which is constituted of dimethylpolysiloxane as a hydrophobic group and polyoxyalkylene as a hydrophilic group, is preferably block copolymer of a straight chain form in which a dimethylpolysiloxane portion and a polyoxyethylene chain are alternately and repeatedly bonded. It is superior because of a long chain length of the primary chain structure and the straight chain form structure. It is considered because one surfactant can adsorb on the surface of a silica particle to cover said particle at plural portions since the surfactant is a block copolymer which is comprised of a hydrophilic group and a hydrophobic group alternately repeating.

Specific examples thereof include such as silicone surfactants ABN SILWET FZ-2203, FZ-2207 and FZ-2208, manufactured by Nippon Unicar Co., Ltd.

Among these silicone oil or silicone surfactants, those containing a polyether group are preferable.

Other surfactants may be utilized in combination, and appropriately utilized in combination are anionic surfactants of such as a sulfonate type, a sulfate ester type and a phosphate ester type; and nonionic surfactants of such as an ether type and an ether ester type which are provided with a polyoxyetylene chain as a hydrophilic group.

In the present invention, the above-described silicone oil or a silicone surfactant is preferably utilized in a low refractive index layer or a layer adjacent to a low refractive index layer, specifically in a hard coat layer or a high refractive index layer. In the case of a low refractive index layer being the outermost surface layer of anti-reflection film, it is effective to improve scratch resistance of the surface in addition to enhancing water-repellency, oil-repellency and anti-staining property of the coated film. The content in coating solutions of a high refractive index layer and a low refractive index layer is preferably 0.05-2.0 weight %. Crack resistance is insufficient when the content is less than 0.05 weight %, while coating unevenness is caused when the content is over 2.0 weight %.

In each layer of the antireflection film or in the coating solution of each layer, additives other than described above (inorganic particles, a polymer, a dispersion medium, a polymerization initiator and apolymerization promotor) may be incorporated, for example, a polymerization inhibitor, a leveling agent, a thickening agent, a coloring inhibitor, a UV absorber, a silane coupling agent, an antistatic additive or an adhesion aid. Each layer of the antireflection film may be formed via a coating method, for example, a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The production method of the rolled film of the present invention is specifically preferably used as a production method of an antireflection film or a hard coat film. It is preferable that an antireflection film is formed by subsequently coating a hard coat layer, a high refractive index layer, and a low refractive index layer coating compositions on a base film of the rolled film.

Preferable examples of a constitution of antireflection film are shown below, however the constitution is not limited thereto.

Herein, the hard coat layer represents the aforementioned actinic ray curable resin layer.

Transparent Substrate Film/Hard coat Layer/High Refractive Index Layer/Low Refractive Index Layer Transparent Substrate Film/Antistatic Layer/Hard coat Layer/High Refractive Index Layer/Low Refractive Index Layer Transparent Substrate Film/Anti-glare Hard coat Layer/High Refractive Index Layer/Low Refractive Index Layer Transparent Substrate Film/Antistatic Layer/Anti-glare Hard coat Layer/High Refractive Index Layer/Low Refractive Index Layer In any case, the aforesaid back coat layer is preferably provided on the surface of transparent substrate film opposite to the side on which a low refractive index layer is coated.

[Back Coat Layer]

The antireflection film of the present invention having a hard coat layer on one surface of the cellulose ester film is preferably provided with a back coat layer on the other surface of the cellulose ester film. It is expected that a back coat layer may reduce curling. Namely, by adding a counter force to curl toward the back coat side, the forces to curl toward the hard coat layer side may be balanced out. Also, a back coat layer preferably has a feature to prevent blocking. For this purpose, particles are preferably added to a coating composition of back coat layer.

The particles incorporated in the back coat layer include inorganic particles and organic particles. Kind of particles, diameter, apparent gravity and method of dispersion are common to those of the particles incorporated in the above mentioned cellulose ester film.

Examples of inorganic particles preferably added to the back coat layer include: silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Particles containing silicon are preferably used to minimize the haze. Of these, silicon dioxide is specifically preferable.

Inorganic particle available on the market include, for example: AEROSIL R972, R972V, R974, R812, 200, 200V, 300, R202, OX50 and TT600, which are manufacture by Nippon Aerosil Co. Ltd. Particles of zirconium oxide available on the market include, for example: AEROSIL R976 and R811 manufacture by Nippon Aerosil Co. Ltd. Particles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 120, 145, 3120 and 240, which are manufactured by Toshiba Silicone Co., Ltd.

Among the particles listed above, AEROSIL 200V and AEROSIL R972V are specifically preferable with respect to effectively preventing blocking while minimizing haze. The kinetic friction coefficient of the rear side of the hard coat layer in the present invention is preferably not more than 0.9 and specifically preferably from 0.1 to 0.9.

The content of particles contained in the back coat layer is preferably 0.1-50% by weight and more preferably 0.1-10% by weight. The increase in haze after the hard coat film is provided with a back coat layer is preferably not more than 1%, more preferably not more than 0.5% and specifically preferably 0.0-0.1%.

The organic solvent used for forming a back coat layer is not specifically limited. The back coat layer may have a function to prevent curling. Specifically, this function may be provided by applying a coating composition containing a solvent which dissolves or swells cellulose ester. The coating composition may occasionally contain a solvent which does not dissolve cellulose ester, in addition to a mixture of the solvents which dissolves and/or swells cellulose ester. The mixing ratio of these solvents and the amount of the coating solution to be used for forming a back coat layer is appropriately determined depending on the extent of the curl and the type of the resin used for the antireflection film.

In order to have a larger effect to preventing curl in the film, the mixing ratio of the solvent which dissolves and/or swells cellulose ester is increased while the ratio of the solvent which does not dissolve nor swell cellulose ester is decreased. The mixing ratio of (the solvent which dissolves and/or swells cellulose ester) to (the solvent which does not dissolve cellulose ester) is preferably 10:0-1:9. Examples of the solvent which dissolves and/or swells transparent resin film include: dioxane, N-methylpyrrolidone, 1,3-dimethyl-2-imidazolidinone, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of the solvent which does not dissolve transparent resin film include: methanol, ethanol, n-propyl alcohol, i-propyl alcohol, n-butanol, cyclohexanol and hydrocarbons (such as benzene, toluene and xylene). When the hardness of the coated layer is 2H or more, it is difficult to prevent curl only by providing the back coat layer.

The back coat layer is coated by means of, for example: a gravure coater, a dip coater, a reverse coater, a wire-bar coater, a die coater, a spray coater and ink-jet printing, in a thickness of preferably from 1 to 100 μm and specifically preferably from 5 to 30 μm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose derivatives such as cellulose nitrate, cellulose acetate propionate (acetyl substitution degree is preferably 1.8-2.3, and propionyl substitution degree is preferably 0.1-1.0), cellulose diacetate, cellulose triacetate and cellulose acetate butylate; (iii) rubber type resins such as a copolymer of maleic acid and/or acrylic acid, a copolymer of acrylate ester, an acrylonitrile/styrene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; (v) a fluorine-containing type resin; and (vi) polymethylmethacrylate and a copolymer of polymethylmethacrylate and polymethylacrylate, however, the present invention is not limited thereto. Examples of acryl resins available on the market include homopolymers and copolymers produced from acryl or methacryl monomers, such as: Acrypet MD, VH, MP and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubishi Rayon Co., Ltd.). A resin used in the present invention may suitably be selected from the above examples.

Cellulose resins such as diacetyl cellulose and cellulose acetate propionate are specifically preferable.

The coating order of a back coat layer on a cellulose ester film is not specifically limited, namely, a back coat layer may be formed before or after forming the hard coat layer, however, when a back coat layer also functions as an antiblocking layer, the back coat layer is preferably formed before the opposite side layers. Coating of a back coat layer may preferably be divided in two or more times.

In the present invention, the surface of a hard coat layer is preferably subjected to a surface treatment after the hard coat layer have been formed, and a high refractive index layer and a low refractive index layer, according to the present invention, are preferably formed on the surface of the hard coat layer having been subjected to said surface treatment.

Examples of a surface treatment include: a cleaning method, an alkali treatment method, a flame-plasma-treatment method, a high-frequency plasma method, an electron beam method, an ion beam method, a sputtering method, an acid treatment, a corona-treatment method, an atmospheric pressure glow-discharge-plasma method. Of these, preferable are an alkali treatment method and a corona-treatment method, and an alkali treatment method is still more preferable.

The reflectance of antireflection film according to the present invention can be measured by a spectrophotometer. At this time, the back surface of the measurement side of a sample is subjected to a light absorption treatment by use of a black colored spray after having been embossing treated, and reflective light in a visible light region (400-700 nm) is measured. The reflectance is preferably as low as possible, however, the mean reflectance in wavelengths of a visible light region is preferably not more than 1.5% and the minimum reflectance is preferably not more than 0.8%. Further, it is preferable to have a flat reflection spectrum in a visible light wavelength region.

Further, the polarizing plate surface having been subjected to an antireflection treatment often has a reflection hue of red or blue because reflectance of shorter wavelengths or longer wavelengths in a visible light region is increased due to design of antireflection film, however, a desire with respect to a color tone of reflective light may differ depending on the application. In the case of the outermost surface of a FPD television, a neutral tone is required. In this case, the reflection hue generally preferred is $0.17 \leq x \leq 0.27$ and $0.07 \leq y \leq 0.17$, on XYZ color specification system (CIE1931 color specification system).

The layer thickness of a high refractive index layer and a low refractive index layer is determined by calculation according to an ordinary method in consideration of reflectance and a color tone of reflective light.

(Polarizing Plate)

The film prepared according to the method of the present invention can be applied to a polarizing plate. The polarizing plate of the present invention can be prepared by employing a common method. For example, the reverse side of the antireflection film of the present invention is subjected to an alkali saponification treatment, while a polarizing film is prepared by stretching a polyvinyl alcohol film (or a modified poly vinyl alcohol film) immersed in an iodine aqueous solution. A polarizing plate is prepared by adhering the above alkali saponified surface of the antireflection film onto one surface of the above polarizing film using an aqueous solution of completely-saponified polyvinyl alcohol as an adhesive. The thickness of the polarizing film is preferably 5-30 μm, and more preferably 10-25 μm. The antireflection film of the present invention or another polarizing plate protective film may be provided on the other surface of the polarizing film. The polarizing plate protective film to be used on the surface opposite to the antireflection film preferably has an in-plane retardation value Ro of 20-200 nm at a wavelength of 590 nm, and Rt of 100-400 nm. Such film is prepared by the method disclosed in, for example, JP-A No. 2002-71957 or Japanese Patent Application No. 2002-155395 (JP-A No. 2003-170492). As the polarizing plate protective film, also preferably employed is a film which also works as an optical compensation film having an optically anisotropic layer in which a liquid crystalline compound, for example, discotic liquid crystalline compound, is oriented. An optically anisotropic layer can be prepared by a method disclosed, for example, in JP-A No. 2003-98348. In combination of the polarizing plate with the antireflection film of the present invention, a polarizing plate exhibiting excellent flatness and improved viewing angle is obtained.

Examples of a polarizing plate protective film employed on the other surface include commercially available cellulose ester films, for example, KC8UX2MW, KC4UX, KC5UX, KC4UY, KC8UY, KC12UR, KC8UCR-3, KC8UCR-4, KC8UCR-5 and KC4UR (all produced by Konica Minolta Opto, Inc.).

The polarizing film which is a major constituting component of a polarizing plate, as described herein, refers to the element which only transmits the light of a polarized wave in the definite direction. The typical polarizing film, which is presently known, is a polyvinyl alcohol based polarizing film. There are two types of polyvinyl alcohol based polarizing films, namely, one is prepared by dying a polyvinyl alcohol based film with iodine and another is prepared by dying a polyvinyl alcohol based film with a dichroic dye. The polarizing film is preferably prepared in such a manner that an aqueous polyvinyl alcohol solution is cast into a film and the resulting cast film is subjected to uniaxially stretching followed by dying, or is subjected to dying followed by uniaxially stretching, and, preferably, the resulting film is subjected to a durability treatment employing a boron compound. One side of the antireflection film of the present invention is adhered to the surface of the above polarizing film to form a polarizing plate. Adhesion is preferably performed employing water-soluble adhesives containing completely-saponified polyvinyl alcohol. For example, a polarizing film disclosed in JP-A Nos. 2004-20633, 2004-20629, 2004-184574, 2003-268127, 2003-248123 or 2000-121829 is preferably used. The thickness of the polarizing film is preferably 5-30 μm.

A polarizing plate in which a conventional antireflection film is used tends to show insufficient flatness, where minute undulation is observed in a reflected image by the polarizing plate. The undulation tends to increase when the polarizing plate is subjected to a durability test at 60° C. under 90% RH. On the contrary, a polarizing plate in which the antireflection film of the present invention is used exhibited an excellent flatness and the undulation observed in a reflected image hardly increases even after a durability test at 60° C. under 90% RH. The polarizing plate, in which an antireflection film of the present invention is provided on one-surface of a polarizing film and an optical compensation film is provided on the other surface, exhibites negligible change in a viewing angle property after the polarizing plate is subjected to a durability test, and provides an excellent visibility.

(Display)

By incorporating the above-mentioned polarizing plate into a display, various displays excellent in visibility can be produced. The antireflection film of the present invention is preferably used in LCDs of various drive systems, such as a reflection mode, a transmission mode, semi transmission mode, a TN mode, an STN mode, an OCB mode, a HAN mode, a VA type (a PVA mode and a MVA type), and an IPS mode. Moreover, the antireflection film of the present invention has remarkably small unevenness in color of the reflected light from the antireflection layer, and is excellent in flatness, and is preferably used also for various display devices, such as plasma display, a field emission display, an organic EL display, an inorganic EL display, and electronic paper. Specifically, when the polarizing plate of the present invention is used in a large screen display of 30 size or more, it provides effects in that unevenness of color, undulation in reflected images and eye-fatigue after long appreciation are considerably reduced.

EXAMPLES

In the following, the present invention will be specifically explained with reference to examples; however, embodiments of the present invention are not limited thereto.

Example 1

Cellulose ester film described in table 1 as a substrate of rolled film (hereinafter also referred to as a rolled film substrate) was prepared according to a method described below, followed by being subjected to the first embossing treatment described in Table 1 and wound, whereby rolled film substrates 1-10 were prepared. A back-coat layer was provided on the surface of this rolled film substrate opposite to the surface having been subjected to the first embossing treatment, further a hard coat layer being successively provided, before being wound, on the first embossing treated surface, and the following antireflection layer was coated on said hard coat layer. The second embossing treatment described in Table 2 was provided at a predetermined timing, and the rolled film was subjected to a heat treatment as a rolled form as it is, whereby rolled films 1-21 (antireflection film) were prepared. Each of the aforesaid embossing treatments was performed by pressing a heated embossing roll. The process will be detailed below.

<Preparation of Rolled Film Substrate Provided with First Embossing Treatment>

(Preparation of Dope)

The following materials were successively charged in a shield vessel and stirring of 3 hours was performed while keeping the temperature at 85° C. after inside temperature of the vessel was raised to 85° C. from 18° C., whereby cellulose ester was completely dissolved. Silicon oxide particles were added by being dispersed, in advance, in a solution comprising a solvent to be added and a small amount of cellulose ester. This dope was filtered twice by use of filter paper (Azumi Filter Paper No. 244, manufactured by Azumi Filter Paper Co., Ltd.) to prepare dope A.

(Preparation of Dope A)

| | |
|---|---|
| Cellulose ester (cellulose triacetate; acetyl group substitution degree of 2.9) | 100 weight parts |
| Trimethylolpropane tribenzoate | 5.5 weight parts |
| Ethylphthalyl ethylgrycolate | 4.5 weight parts |
| Silicon oxide particles (Aerosil R972V (manufactured by Nippon Aerosil Co., Ltd.)) | 0.2 weight parts |
| Methylene chloride | 300 weight parts |
| Ethanol | 40 weight parts |

The dope prepared in the above manner was cast on a support made of a stainless steel endless belt kept at 35° C. through a casting die warmed at 35° C. to form a web and then the web was peeled off from the support by a peeling roll after having been dried on the support until the residual solvent reached 75 weight %.

Successively, the web was dried by a drying wind at 70° C. in a transport drying process comprising plural rolls arranged up and down and stretched in the lateral direction (width direction) of the web at 130° C. so as to make the width of 1.1 times of that before stretching after having been held by a tenter at the both edge portions. After having been stretched by a tenter, the web was dried at 120° C. in a transport drying process comprising plural rolls arranged up and down until the residual solvent decreased to 0.1 weight % and the both edge portions in the width direction were slit before winding to make a width of 1.4 m. By pressing to this part an embossing roll heated at 270° C. to provide the first embossing treatment having a predetermined height and a width, described in Table 1, on the both edge portions, and the web was wound to prepare rolled cellulose ester film having a film thickness of 80 µm, a length of 2000 m and a refractive index of 1.49, which was designated as roll film substrate No. 1. The stretching ratio in the web transport direction, which is calculated from a rotation speed of a stainless band support and a rotation speed of a tenter, was set to 1.1 times. In a similar manner, rolled film substrates 2-10 described in Table 1 were prepared. The film thickness was adjusted by a dope amount cast on a stainless belt.

TABLE 1

| Rolled film substrate | | Height of first | Width of first | |
|---|---|---|---|---|
| No. | Film thickness (µm) | Width (m) | embossing treatment (µm) | embossing treatment (mm) | Wind up length (m) |
| 1 | 80 | 1.4 | 7 | 15 | 2000 |
| 2 | 80 | 1.4 | 12 | 15 | 2000 |
| 3 | 80 | 1.4 | 30 | 10 | 2000 |
| 4 | 80 | 1.4 | None | None | 2000 |
| 5 | 80 | 1.4 | 7 | 30 | 2000 |
| 6 | 40 | 1.4 | None | None | 3000 |
| 7 | 40 | 1.4 | 5 | 15 | 3000 |
| 8 | 40 | 1.4 | 8 | 15 | 3000 |
| 9 | 40 | 1.4 | 10 | 15 | 3000 |
| 10 | 40 | 1.4 | 20 | 15 | 3000 |

<Preparation of Rolled Film Having Hard Coat Layer as Coated Layer>

With respect to a rolled film substrate prepared in Table 1, on the surface opposite to the surface which had been subjected to the first embossing treatment, the following back-coat layer composition was coated by an extrusion coater so as to make a wet layer thickness of 10 µm and dried, whereby a back-coat layer was provided.

| <Back-coat Layer Composition> | |
|---|---|
| Acetone | 54 weight parts |
| Methyl ethyl ketone | 24 weight parts |
| Methanol | 22 weight parts |
| Diacetyl cellulose | 0.6 weight parts |
| Acetone dispersion containing 2% of particle silica (Aerosil 200V, manufactured by Nippon Aerosil Co., Ltd.) | 0.2 weight parts |

Acetone dispersion containing 2% of particle silica (Aerosil 200V, manufactured by Nippon Aerosil Co., Ltd.)

0.2 weight parts

Further, following hard coat layer coating solution 1 was filtered through a polypropylene filter having a pore diameter of 0.4 µm to prepare hard coat layer coating solution 1, which was coated by use of a gravure coater on the surface having been provided with the first embossing treatment, dried at 90° C., and the coated layer was cured by use of an ultraviolet lamp at a luminance at the irradiation portion of 100 mW/cm$^2$ with a irradiation amount of 0.1 J/cm$^2$, whereby a hard coat layer having a predetermined layer thickness described in Table 2 was formed.

(Hard Coat Layer Coating Solution 1)

The following materials were stirred and mixed to prepare hard coat layer coating solution 1.

| | |
|---|---|
| Acrylic monomer; Kayarad DPHA (dipentaerythritol hexaacrylate, manufactured by Nippon Kayaku Co., Ltd.) | 225 weight parts |
| Irgacure 184 (manufactured by Ciba Specialty Chemicals Inc.) | 20 weight parts |
| Propyleneglycol monomethylether | 110 weight parts |
| Ethyl acetate | 110 weight parts |

<Preparation of Antireflection Film>

A high refractive index layer and successively a low refractive index layer in this order as an antireflection layer were coated on the above-prepared each hard coat film in the following manner, whereby antireflection film was prepared.

(Preparation of Antireflection Layer: High Refractive Index Layer)

On a hard coat layer, following high refractive index layer coating composition 1 was coated with an extrusion coater and dried at 80° C. for 1 minute, followed by being cured by irradiation with ultraviolet rays at 0.1 J/cm$^2$, further being cured at 100° C. for 1 minute to provide high refractive index layer 1 having a thickness of 78 nm. The refractive index of this high refractive index layer was 1.62.

<High Refractive Index Layer Coating Composition 1>

| | |
|---|---|
| Isopropylalcohol dispersion of metal oxide particles (solid content of 20%, ITO particles, mean particle diameter of 80 nm) | 55 weight parts |
| Metalcompound: Ti(OBu)$_4$ (tetra-n-butoxy titanium) | 1.3 weight parts |
| Ionization radiation curable resin: dipentaerythritol hexaacrylate | 3.2 weight parts |
| Photoinitiator: Irgacure 184 (manufactured by Ciba Specialty Chemicals Inc.) | 0.8 weight part |
| Propyleneglycol monomethylether solution containing 10% of dimethyl silicon EO block-copolymer (FZ-2207, manufactured by Nippon Unicar Co., Ltd.) | 1.5 weight parts |
| Propyleneglycol monomethylether | 120 weight parts |
| Isopropyl alcohol | 240 weight parts |
| Methyl ethyl ketone | 40 weight parts |

The following low refractive index layer coating composition was coated on the above-described each high refractive index layer so as to make a thickness after drying of 95 nm by use of an extrusion coater and dried at 100° C. for 1 minute, followed by being cured at radiation of 0.1 J/cm$^2$ with ultraviolet rays, and the resulting film was wound after being further dried at 110° C. for 6 minutes.

<Preparation of Low Refractive Index Layer Coating Composition 1>

<Preparation of Tetraethoxysilane Hydrolyzed Compound A>

Tetraethoxysilane of 289 g and 553 g of ethanol were mixed, and 157 g of 0.15% acetic acid aqueous solution was added thereto, followed by being stirred in a water bath at 25° C. for 30 hours, whereby hydrolyzed compound A was prepared.

| | |
|---|---|
| (d) Tetraethoxy silan hydrolyzed compound A | 110 weight parts |
| (e) Hollow silica type particles (P-2 described below) KBM 503 (a silane coupling agent, manufactured by Shin-Etsu Chemical Co., Ltd.) | 30 weight parts / 4 weight parts |
| (f) Propyleneglycol monomethylether solution containing 10% of straight dimethyl silicone EO block copolymer (FZ-2207, manufactured by Nippon Unicar Co., Ltd.) | 3 weight parts |
| Propyleneglycol monomethylether | 400 weight parts |
| Isopropyl alcohol | 400 weight parts |

<Preparation of Hollow Silica Particles P-2>

Silica sol, having a mean particle diameter of 5 nm and a SiO$_2$ concentration of 20 weight %, of 100 g and 1900 g of pure water were heated at 80° C. The pH of this solution was 10.5, and into said solution 9000 g of sodium silicate aqueous solution containing 0.98 weight % SiO$_2$ and 9000 g of sodium aluminate aqueous solution containing 1.02 weight % Al$_2$O$_3$ were simultaneously added. Meanwhile, the temperature of the reaction solution was kept at 80° C. The pH of the reaction solution was raised to 12.5 immediately after addition and became stable thereafter. After finishing the addition, the reaction solution was cooled to room temperature and washed with an ultra-filtration membrane to prepare a SiO$_2$.Al$_2$O$_3$ nucleus particle dispersion having a solid concentration of 20 weight % (process (a)).

To this nucleus particle dispersion of 500 g, 1700 g of pure water were added and the resulting solution was heated at 98° C., and 3000 g of a silicic acid solution (SiO$_2$ concentration of 3.5 weight %), which were prepared by dealkalization of a sodium silicate aqueous solution by use of cationic ion exchange resin, were added while keeping this temperature, whereby a dispersion of nucleus particles forming the first silica cover layer was prepared (process (b)).

Successively, 500 g of nucleus particle dispersion having formed the first silica cover layer a solid concentration of which became 13 weight % by washing with an ultrafiltration membrane was added with 1125 g of pure water, and further being titrated with concentrated hydrochloric acid to make pH of 1.0 to perform dealuminum treatment. Next, aluminum salt, which had been dissolved, was removed by use of an ultrafiltration membrane while adding 10 L of a hydrochloric acid aqueous solution having a pH of 3 and 5 L of pure water, to eliminate a part of constituent components of nucleus particles, which had formed the first silica cover layer, whereby a dispersion SiO$_2$.Al$_2$O$_3$ porous particles was prepared (process (c)).

After a mixed solution containing 1500 g of the above-described porous particle dispersion, 500 g of pure water, 1750 g of ethanol and 626 g of 28% ammonium water was heated at 35° C., 104 g of ethyl silicate (28 weight % SiO$_2$) was added and the surface of porous particles, on which the first silica cover layer had been formed, were covered with a hydrolysis polycondensation compound to form the second silica cover layer. Successively, a dispersion of hollow silica type particles (P-2) having a solid concentration of 20 weight % was prepared by substituting the solvent into ethanol by use of an ultrafiltration membrane.

A thickness of the first silica cover layer on this hollow silica type particle was 3 nm, a mean particle diameter was 47 nm, a MO$_x$/SiO$_2$ (mol ratio) was 0.0017, and a refractive index was 1.28. Herein, a mean particle diameter was measured by means of dynamic light scattering method.

(Heat Treatment Process)

Each rolled film provided with a hard coat layer and an antireflection layer in this manner (antireflection film) was heated from room temperature to 75° C. at a temperature rising rate of 1° C./hour over approximately 2 days, followed by being kept standing at 75° C. for 6 days, and was further cooled to room temperature at a temperature descending rate of 2° C./hour over approximately 1 day, whereby rolled film 1-21 were prepared. Herein, a refractive index of the low refractive index layer was 1.37.

Herein, each rolled film was subjected to the second embossing treatment described in Table 2 before the heat treatment process.

<Evaluation Method>

A refractive index of each layer which constitutes an antireflection layer was measured according to the following method.

(Refractive Index)

A refractive index of each refractive index layer was determined from a measurement result of spectral reflectance of a spectrophotometer with respect to samples in which each layer was independently coated on a hard coat layer prepared below. The measurement of a reflectance in a visible region (400-700 nm) was performed at a regular reflection at 5 degrees by use of U-4000 Type Spectrophotometer (produced by Hitachi, Ltd.), while the back surface as a measurement surface was subjected to a light absorbing treatment to prevent light reflection by use of a black spray after having been embossing treated.

(Particle Diameter of Metal Oxide Particles)

A particle diameter of utilized metal oxide particles was determined by measuring each 100 particles through an electron microscope (SEM) and calculating the average vale of a diameter of a circle circumscribing each particle as a particle diameter.

Evaluations were made according to the following methods with respect to prepared rolled film (antireflection film) samples. The evaluation results are shown in Table 2.

(Reflectance)

A spectral reflectance at an incident angle of 5 degrees was measured in a wavelength region of 380-780 nm by use of a spectrophotometer (U-4000, produced by Hitachi, Ltd.). Since antireflection ability is superior when reflectance in a wide wavelength range is the smaller, the minimum reflectance in 450-650 nm was determined from the measured results. The measurement was carried out while the back surface as the observing side was subjected to a light absorbing treatment to prevent light reflection on the film back surface by use of a black spray after having been embossing treated.

As the result, a reflectance of every antireflection film 1-21 was 0.4%.

(Pencil Hardness)

According to JIS K 5600, samples were scratched at a load of 1 Kg by use of a pencil having a predetermined hardness on a pencil hardness tester (Clemen Type Scratch Hardness Tester HA-301, manufactured by Tester Sangyo Co., Ltd.) and generation of flaws was visually observed. In the case that a flaw is generated not less than twice by a pencil having a hardness of 3H and not more than one time by a pencil having a hardness of 2H, among each 5 times scratch, the hardness is defined as 2H. In the case that a flaw with a pencil having a hardness of 4H is generated not less than twice and not more than one time with a pencil having a 3H, among each 5 times scratch, the hardness is defined as 3H. In a similar manner, pencil hardness was confirmed.

(Curl Evaluation)

A sample having a size of 5 mm×5 cm, being cut out from rolled film (antireflection film), was placed on a flat table after having been kept in a conditioning room at a temperature of 23° C. and 55% RH for 24 hours, and the radius of curvature which coincides with the sample was determined employing a curvature scale, whereby a magnitude of curl and handling easiness were evaluated as follows. Herein, a radius of curvature refers to 1/(a radius of a circle which coincides with a sample) (1/m).

A: Less than 0-5
B: Less than 5-10
C: Less than 10-30
D: Not less than 30

Herein, A and B are practically usable with respect to handling, however, C and worse are significantly difficult to be handled.

(Deformation of Role)

5: No deformation of a roll at all
4: Little deformation of a roll
3: A small deformation of a roll
2: Deformation of a roll is clearly recognized.
1: Significant deformation of a roll is observed.

In practical use, criteria 4 and better are usable levels.

(Orange Peel Defect)

Presence of slight convexoconcave similar to a orange peel on the surface of each sample was visually observed for evaluation.

A: No orange peel defects are generated.
B: A few orange peel defects are observed.
C: Many orange peel defects are generated.

<Evaluation of Reflection Color Unevenness>

Color unevenness of reflection light with respect to 1 m² of prepared reflection film was visually evaluated based on the following criteria.

A: No tone change of reflection light is observed.
B: Tone change of reflection light is very partly observed (less than 10% of the area).
C: Tone change of reflection light is partly observed (not less than 10% and less than 30% of the area).
D: Tone change of reflection light was observed all over the area.

TABLE 2

| | | Timing of second embossing treatment | | | | |
|---|---|---|---|---|---|---|
| Rolled film (Antireflection film) No. | Rolled film substrate | After coating of hard-coat layer and before coating of high refractive index layer | After coating of low refractive index layer | Layer thickness of hard-coat layer (μm) | Height of Second Embossing Treatment (μm) | Width of Second Embossing Treatment (mm) |
| 1 | 1 | — | — | 7 | None | None |
| 2 | 1 | — | Yes | 7 | 7 | 15 |
| 3 | 1 | Yes | — | 7 | 15 | 15 |
| 4 | 1 | — | Yes | 7 | 15 | 15 |
| 5 | 2 | — | Yes | 7 | 20 | 15 |
| 6 | 3 | — | — | 7 | None | None |
| 7 | 4 | — | Yes | 7 | 31 | 15 |

TABLE 2-continued

| | | | | | | |
|---|---|---|---|---|---|---|
| 8 | 2 | — | Yes | 7 | 11 | 15 |
| 9 | 2 | — | Yes | 10 | None | None |
| 10 | 2 | — | Yes | 10 | 15 | 15 |
| 11 | 2 | — | Yes | 20 | 30 | 15 |
| 12 | 4 | — | Yes | 20 | 30 | 15 |
| 13 | 5 | — | Yes | 10 | 15 | 15 |
| 14 | 6 | — | Yes | 7 | 10 | 15 |
| 15 | 7 | — | Yes | 7 | 10 | 10 |
| 16 | 8 | Yes | — | 7 | 10 | 10 |
| 17 | 8 | — | Yes | 7 | 10 | 10 |
| 18 | 8 | — | Yes | 7 | 15, 10 | 10 |
| 19 | 8 | — | — | 7 | None | None |
| 20 | 9 | — | Yes | 10 | 15 | 15 |
| 21 | 10 | — | — | 10 | None | None |

| Rolled film (Antireflection film) No. | Curl | Deformation of roll | Orange peel defect | Color unevenness | Pencil hardness | Remarks |
|---|---|---|---|---|---|---|
| 1 | D | 2 | C | D | 3H | Comparison |
| 2 | B | 5 | A | A | 3H | Invention |
| 3 | A | 5 | A | B | 3H | Invention |
| 4 | A | 5 | A | A | 3H | Invention |
| 5 | A | 5 | A | A | 3H | Invention |
| 6 | D | 2 | C | D | 3H | Comparison |
| 7 | D | 1 | C | D | 3H | Comparison |
| 8 | B | 5 | A | A | 3H | Invention |
| 9 | D | 1 | C | D | 4H | Comparison |
| 10 | A | 5 | A | A | 4H | Invention |
| 11 | A | 5 | A | A | 5H | Invention |
| 12 | D | 1 | C | D | 5H | Comparison |
| 13 | A | 5 | A | A | 4H | Invention |
| 14 | D | 1 | C | D | 3H | Comparison |
| 15 | A | 5 | A | A | 3H | Invention |
| 16 | A | 5 | A | B | 3H | Invention |
| 17 | A | 5 | A | A | 3H | Invention |
| 18 | A | 5 | A | A | 4H | Invention |
| 19 | D | 2 | C | D | 3H | Comparison |
| 20 | A | 5 | A | A | 4H | Invention |
| 21 | D | 1 | C | D | 4H | Comparison |

In the first 1000 m of the rolled film of No. 18, the height of the second embossing treatment was set to 15 μm and that of the rest of the rolled film was set to 10 μm.

It is clear from Table 2 that rolled film (antireflection film) Nos. 2-5, 8, 10, 11, 13, 15-18 and 20 according to the present invention are excellent without generation of curl, deformation of a roll, orange peel defects nor tone unevenness. In particular, a sample, in which a height of an embossed portion had been made thicker as approaching to the core side, such as No. 18, was proved to be excellent in the above-described characteristics.

Further, samples in which a temperature rising and descending rate was set in a range of 10-30° C./day were proved to be improved in decreasing orange peel defects and color unevenness.

Example 2

When a lot, similar to a roll prepared in example 1 but of a different production date, was subjected to thermal treatment similar to example 1 and similarly evaluated, it has been proved that samples according to the present invention showed little variation among lots.

Example 3

When antireflection film prepared according to the present invention was utilized as film being positioned at the outermost of polarizer protective film in a liquid crystal cell having a size of 17 inches by 40 inches, it has been proved that highly uniform optical film without exhibiting sensory differences of color unevenness can be prepared.

What is claimed is:

1. A method of manufacturing a rolled film having thereon a coated layer comprising the steps of:
   (i) preparing a long substrate film;
   (ii) conducting a first embossing treatment on a part of a width of the long substrate film along a longitudinal direction of the long substrate film;
   (iii) forming the coated layer on the long substrate film to form a long coated film;
   (iv) conducting a second embossing treatment on a part of the width of the long coated film along the longitudinal direction of the long coated film;
   (v) winding the long coated film to form the rolled film having thereon the coated layer; and
   (vi) heating the rolled film at a temperature of 50 to 150° C. for 1 to 30 days in a rolled state,
   wherein
   the first embossing treatment and the second embossing treatment each are conducted by pressing an embossing roll heated at a temperature of 150-300° C. on the film; and
   a second embossed portion is provided partly or totally overlapping with a first embossed portion.

2. The method of claim 1, wherein a height of embossing formed by the first and the second embossing treatments is 5 to 30 μm from a level of the substrate film.

3. The method of claim 1, wherein a thickness of the coated layer after dried is 3 to 20 µm.

4. The method of claim 1, wherein a height of embossing formed by the second embossing treatment is larger than a height of embossing formed by the first embossing treatment.

5. The method of claim 1, wherein a thickness of the long substrate film is 10 to 200 µm.

6. The method of claim 1, wherein the coated layer comprises a hard coat layer having a hardness of 2H to 5H.

7. The method of claim 1, wherein the coated layer comprises a hard coat layer having a hardness of 2H to 5H and an antireflection layer.

8. The method of claim 1, wherein the rolled film having thereon a coated layer has a back coat layer on a rear surface of the rolled film reverse to the surface on which the coated layer is formed.

* * * * *

UNITED STATES PATENT AND TRADEMARK OFFICE
CERTIFICATE OF CORRECTION

PATENT NO. : 7,641,837 B2  
APPLICATION NO. : 11/356640  
DATED : January 5, 2010  
INVENTOR(S) : Takiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Sixteenth Day of November, 2010

David J. Kappos  
*Director of the United States Patent and Trademark Office*